(12) United States Patent
Leverger et al.

(10) Patent No.: US 12,012,049 B2
(45) Date of Patent: *Jun. 18, 2024

(54) FASTENING CLIP DEVICE CONFIGURED TO SECURE A DOOR MODULE TO A DOOR FRAME OF A VEHICLE

(71) Applicant: ILLINOIS TOOL WORKS INC., Glenview, IL (US)

(72) Inventors: Eric Leverger, Epone (FR); Fulvio Yon, Donnas (IT); James S. Tisol, Jr., Chippewa Falls, WI (US)

(73) Assignee: Illinois Tool Works INc., Glenview, IL (US)

( * ) Notice: Subject to any disclaimer, the term of this patent is extended or adjusted under 35 U.S.C. 154(b) by 651 days.

This patent is subject to a terminal disclaimer.

(21) Appl. No.: 17/156,057

(22) Filed: Jan. 22, 2021

(65) Prior Publication Data

US 2021/0138973 A1  May 13, 2021

Related U.S. Application Data

(63) Continuation of application No. 16/092,544, filed as application No. PCT/US2017/030593 on May 2, 2017.

(Continued)

(30) Foreign Application Priority Data

Nov. 8, 2016 (FR) ...................................... 1660768

(51) Int. Cl.
*F16B 21/00* (2006.01)
*B60J 5/04* (2006.01)
(Continued)

(52) U.S. Cl.
CPC ......... *B60R 13/0206* (2013.01); *B60J 5/0416* (2013.01); *B60J 5/0468* (2013.01);
(Continued)

(58) Field of Classification Search
CPC ........ F16B 21/06; F16B 5/0642; F16B 21/04; F16B 5/10; B60R 13/0243; B60R 13/0206; B60J 5/0486; B60J 5/0416
(Continued)

(56) References Cited

U.S. PATENT DOCUMENTS 2,555,291 A   5/1951  Poupitch
3,407,454 A * 10/1968  Myatt ..................... F16B 21/02
                                                     411/549

(Continued)

FOREIGN PATENT DOCUMENTS

CN    105134729 A   12/2015
DE     1784610 A1    9/1971
(Continued)

OTHER PUBLICATIONS

Office Action issued for Chinese Patent Application No. 201780082416.4 dated Jul. 2, 2020 (7 pages).
(Continued)

*Primary Examiner* — Gary W Estremsky
(74) *Attorney, Agent, or Firm* — Quarles & Brady LLP

(57) ABSTRACT

A device for securing one or more units includes a first component and a second component configured to couple to the first component. The first component includes a body that has an elongated shape and a head that is connected to an upper longitudinal end of the body. The head includes a part that is configured to be rotationally engaged by a tool. The first component also includes a retainer at a lower longitudinal end of the body. The first component further includes an elastic latch formed in a thickness of the body.

(Continued)

The elastic latch includes a tab that has an upper end connected to the body and a free lower end. The elastic latch is configured to cooperate with complementary means of one or both of the second component or the one or more units.

20 Claims, 19 Drawing Sheets

Related U.S. Application Data

(60) Provisional application No. 62/452,436, filed on Jan. 31, 2017.

(51) Int. Cl.
- B60R 13/02 (2006.01)
- F16B 5/10 (2006.01)
- F16B 21/04 (2006.01)
- F16B 5/06 (2006.01)
- F16B 21/08 (2006.01)

(52) U.S. Cl.
CPC ......... B60J 5/0486 (2013.01); B60R 13/0243 (2013.01); F16B 5/10 (2013.01); F16B 21/04 (2013.01); F16B 5/0642 (2013.01); F16B 21/086 (2013.01)

(58) Field of Classification Search
USPC .......................................................... 411/349
See application file for complete search history.

(56) References Cited

U.S. PATENT DOCUMENTS

| | | | |
|---|---|---|---|
| 4,145,862 A * | 3/1979 | Sygnator | F16B 5/10 |
| | | | 52/749.1 |
| 4,762,437 A | 8/1988 | Mitomi | |
| 5,367,427 A * | 11/1994 | Matsko | G05B 19/108 |
| | | | 361/96 |
| 5,368,427 A | 11/1994 | Pfaffinger | |
| 5,375,954 A * | 12/1994 | Eguchi | F16B 19/1081 |
| | | | 411/908 |
| 5,779,422 A | 7/1998 | Petignat | |
| 6,769,724 B2 | 8/2004 | Krispin | |
| 6,955,515 B2 | 10/2005 | Barina et al. | |
| 7,955,038 B2 * | 6/2011 | Silbereisen | F16B 21/02 |
| | | | 24/663 |
| 7,959,214 B2 | 6/2011 | Salhoff | |
| 10,182,609 B2 | 1/2019 | Bryne | |
| 2002/0021950 A1 * | 2/2002 | Ichikawa | F16B 5/0642 |
| | | | 411/349 |
| 2002/0090277 A1 | 7/2002 | LeVey | |
| 2003/0059255 A1 | 3/2003 | Kirchen | |
| 2003/0077144 A1 | 4/2003 | Perrot | |
| 2004/0052579 A1 * | 3/2004 | Draggoo | F16B 21/082 |
| | | | 403/326 |
| 2004/0170491 A1 | 9/2004 | Hulin et al. | |
| 2010/0272540 A1 * | 10/2010 | Bucker | F16B 21/086 |
| | | | 411/549 |
| 2012/0073089 A1 | 3/2012 | Buillas | |
| 2015/0089778 A1 * | 4/2015 | Tisol, Jr. | F16B 21/02 |
| | | | 24/663 |
| 2015/0248975 A1 * | 9/2015 | Bonfanti | H01R 13/213 |
| | | | 200/50.28 |
| 2016/0040705 A1 * | 2/2016 | Peter | F16B 21/02 |
| | | | 403/348 |
| 2017/0050583 A1 * | 2/2017 | Koneval | B60J 5/0416 |
| 2018/0148003 A1 * | 5/2018 | Hübner | B60R 13/0243 |
| 2019/0032696 A1 * | 1/2019 | Sbongk | F16B 21/086 |

FOREIGN PATENT DOCUMENTS

| | | |
|---|---|---|
| DE | 202013101021 U1 | 6/2014 |
| GB | 2239686 A | 7/1991 |
| WO | 2008/101531 A1 | 8/2008 |

OTHER PUBLICATIONS

International Search Report and Written Opinion, International Application No. PCT/US2017/030593, mailed Jul. 31, 2017 10 pages.

Second Office Action issued in related Chinese Patent Application No. 201780082416.4, dated Mar. 29, 2021 (24 pages) (English translation included).

* cited by examiner

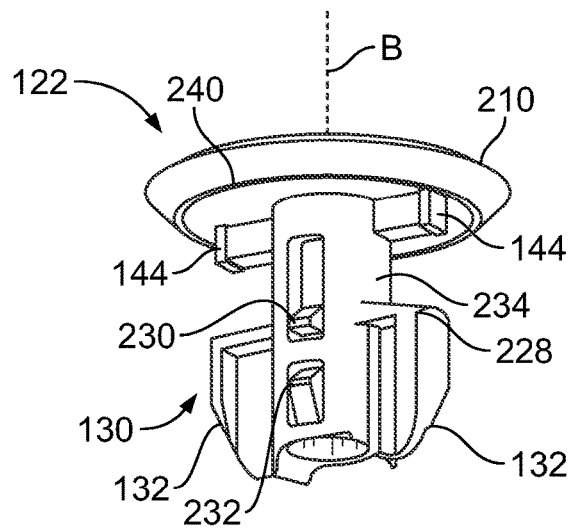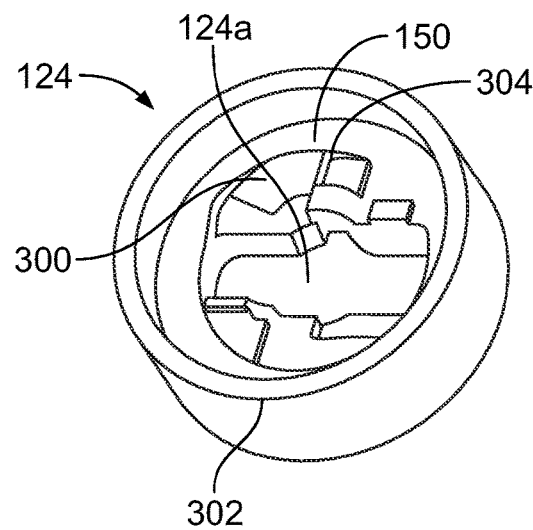
FIG. 48  FIG. 49
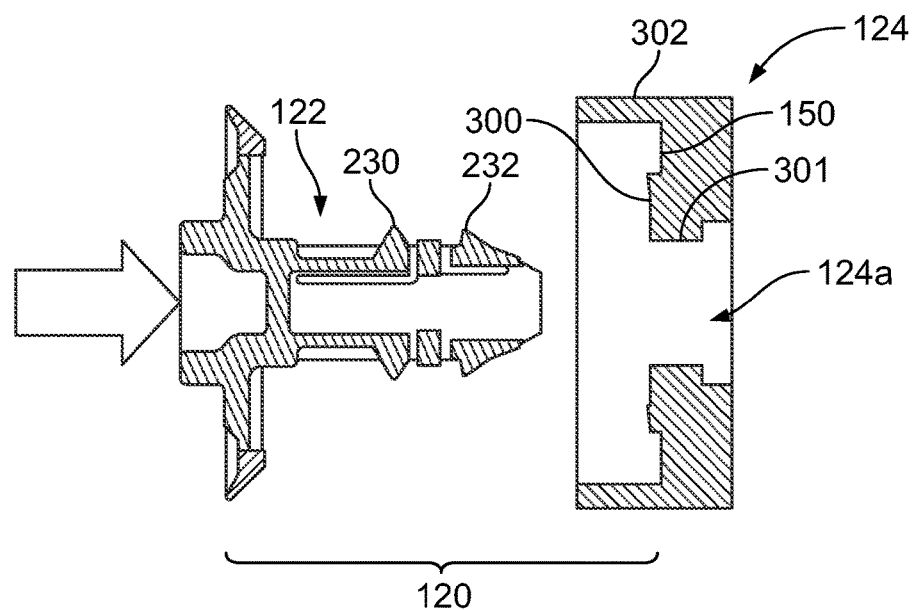
FIG. 50

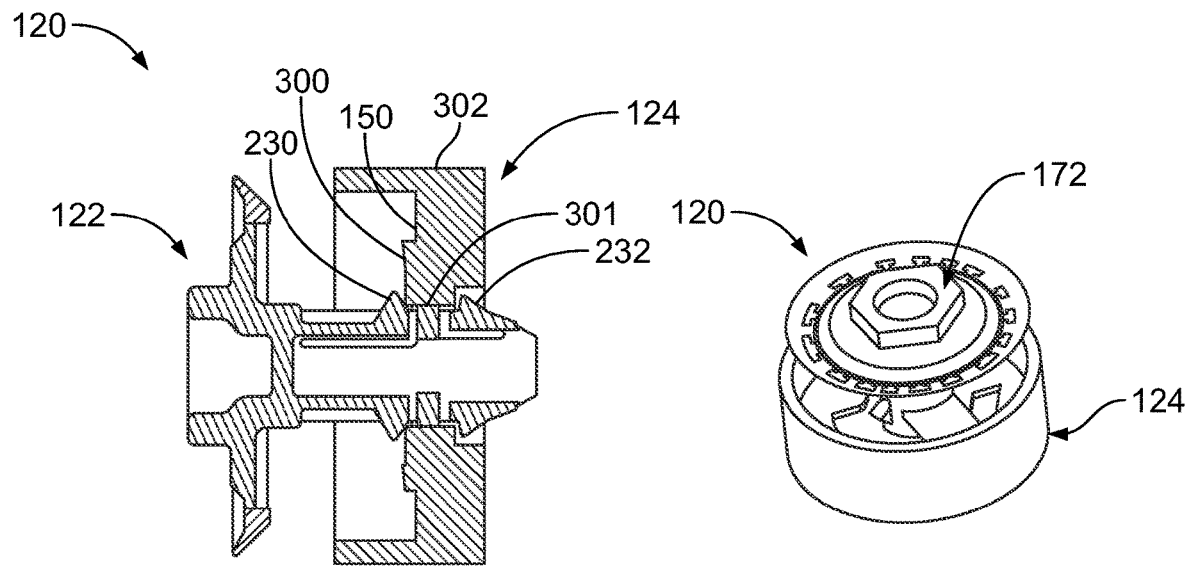
FIG. 51  FIG. 52
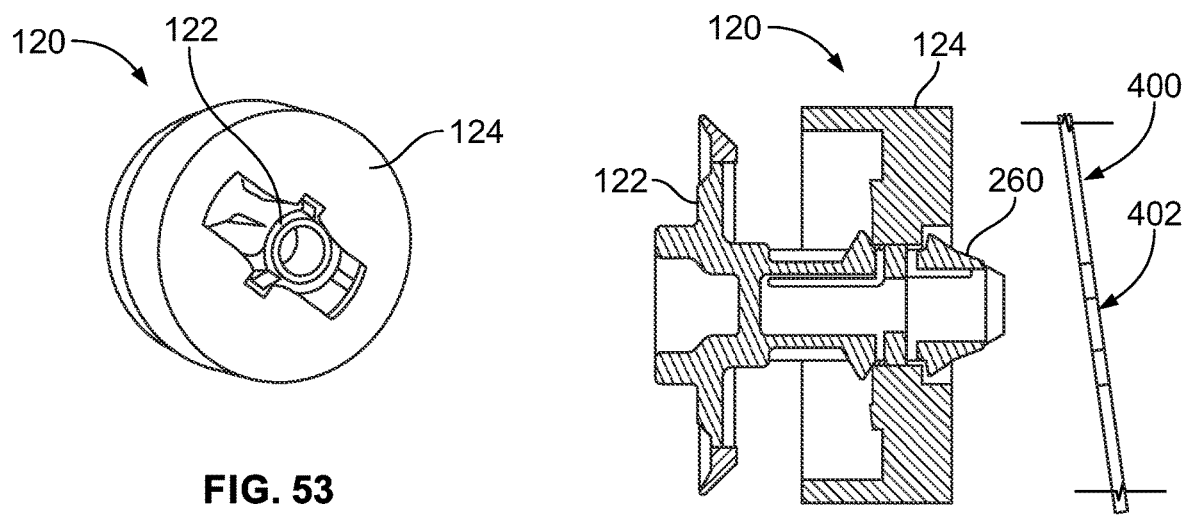
FIG. 53  FIG. 54

FASTENING CLIP DEVICE CONFIGURED TO SECURE A DOOR MODULE TO A DOOR FRAME OF A VEHICLE

RELATED APPLICATIONS

This application is a continuation of U.S. application Ser. No. 16/092,544, filed on Oct. 10, 2018, which represents the United States National Stage of International Application No. PCT/US2017/030593 filed on May 2, 2017, which claims priority to U.S. Provisional Patent Application No. 62/452,436, filed on Jan. 31, 2017, and French Patent Application No. 1660768, filed Nov. 8, 2016, each of which is incorporated herein by reference in its entirety.

FIELD OF EMBODIMENTS OF THE DISCLOSURE

Embodiments of the present disclosure generally relate to a fastening clip device that is configured to secure a door module to a door frame of a vehicle.

BACKGROUND

Various vehicles, such as automobiles, include doors that are configured to be moved between open and closed positions. Many vehicle doors include various controls on an interior side.

A typical vehicle door includes a main door structure or frame and a door module secured to the door frame. A door module is securely fixed the door frame, such as through fasteners. In general, the door module securely mounts to the door frame, while also providing a seal therebetween, in order to prevent moisture from infiltrating between the door module and the door frame. Typically, the process of effectively securing a door module to a door frame is time and labor intensive.

It is advantageous to attach and secure a door module to a door structure rather than forming the door module and the door structure as a single piece. The door structure includes, for example, an upper part forming a frame designed to delimit the contour of a side window of the vehicle, and a lower part, recessed and designed to accommodate a panel formed by the door module.

The manufacturing process is simplified by making the door module and the door structure from different materials. The door structure is usually made of metal and the door module can be made of metal or plastic. This can furthermore facilitate the installation of certain equipment items of the door, such as a system for actuating a window of the door. It is therefore advantageous to install the system on a door module, then to secure the door module to the door structure, rather than installing the system directly on a door structure, which is a relatively heavy and cumbersome unit.

The two units (that is, the door module and the door structure) are secured together and a peripheral seal is typically inserted and designed to be gripped therebetween. It is further advantageous for the two units to be secured by simple, robust and low-cost devices, which allow them to be disassembled if possible.

A known securing device includes a body having an upper end that is connected to a head and a lower end that includes a retainer. The body is designed to be inserted in orifices of the units to be secured and the retainer is designed to bear against a lower surface of the lower unit, the upper unit being inserted between the head and the lower unit. The retainer includes a cam surface that is designed to cooperate with the aforementioned lower surface so that a rotation of the component in relation to the units to be secured drives a downward translation (in relation to the units to be secured). The head of the component is then gripped against the upper unit. This is made possible by the fact that the distances, respectively maximum and minimum, along the axis of rotation of the component, between the cam surface and the head of the component, are respectively greater and less than the combined thickness of the units to be secured and of the seal inserted between these units. The compressive stress of the seal between the units depends in particular on the dimension, along the same axis, of the cam surface of the component. When the component rotates, sufficient torque must be applied to the head of the component so as to make it turn. This torque must be sufficient to overcome the aforementioned compressive stress, and can be very difficult, or even impossible, to obtain manually depending on the manufacturing tolerances of the units.

Furthermore, the orifices of the units in which the body of the component is inserted can be made by stamping, in particular when these units are in sheet metal. Burs resulting from the stamping operation can appear on the periphery of the orifices. These burs can impede the aforementioned rotation of the component, or even make it impossible, and can also damage the retainers of the component, in particular when the latter is made of plastic material.

SUMMARY OF EMBODIMENTS OF THE DISCLOSURE

A need exists for systems and methods that efficiently facilitate the securing of two units, such as a door module and a door structure of, for example, a motor vehicle.

According to a first aspect, a device for securing one or more units comprises a first component and a second component that is configured to couple to the first component. The first component includes a body that has an elongated shape and a head that is connected to an upper longitudinal end of the body. The head includes a part that is configured to be rotationally engaged by a tool. The first component also comprises a retainer at a lower longitudinal end of the body. The first component further comprises an elastic latch formed in a thickness of the body. The elastic latch includes a tab that comprises an upper end connected to the body and a free lower end. The elastic latch is configured to cooperate with complementary means of one or both of the second component or the one or more units.

According to some embodiments, the second component includes at least one cam surface and the first component includes at least one follower. The follower is configured to cooperate with the at least one cam surface. The first component is configured to cooperate with the second component to transform a rotational movement of the first component into a longitudinally-upward translation movement of the first component in relation to the second component. Portions of the at least one follower are configured to snapably secure into at least one reciprocal notch of the second component to securely lock the first component to the second component. In other embodiments, the free lower end of the tab includes a securing clip. The securing clip extends radially outwards from the tab. In some embodiments, the body comprises an internal cavity. In further embodiments, the retainer comprises one or more fingers. The one or more fingers include at least one chamfered edge.

According to another aspect, a device for securing a first unit to a second unit comprises a first component and a second component that is configured to couple to the first component. The first component includes a body that has an elongated shape and is configured to be inserted in at least one of a first orifice of the first unit and a second orifice of the second unit. The first component also includes a head that is connected to an upper longitudinal end of the body. First and second securing clips outwardly extend from a central post of the body of the first component. The first and the second securing clips are vertically aligned and spaced apart. The first component further includes a retainer at a lower longitudinal end of the body. The retainer is configured to bear against a lower surface of the second unit.

According to some embodiments, the first component is configured to cooperate with the second component to transform a rotational movement of the first component into a longitudinally-upward translation movement of the first component in relation to the second component. The second component includes at least one cam surface. The first component includes at least one follower. The follower is configured to cooperate with the at least one cam surface. Portions of the at least one follower are configured to snapably secure into at least one reciprocal notch of the second component to securely lock the first component to the second component. In other embodiments, the head includes a part that is configured to be rotationally engaged by a tool. A portion of the head includes a hexagonal shape. In some embodiments, the first component further comprises third and fourth securing clips that extend outwardly to form the central post diametrically opposite relative to the first and the second securing clips. The third and the fourth securing clips are vertically aligned and spaced apart. The first and the second securing clips and the third and the fourth securing clips are configured to secure the first component to the second component in a pre-assembled position. In further embodiments, the retainer includes two fingers transverse and diametrically opposite one another relative to a longitudinal axis of the body. Each finger includes a chamfered edge and a substantially flat upper surface perpendicular to the longitudinal axis of the body.

According to yet another aspect, a device for securing one or more units comprises a first component and a second component that is configured to couple to the first component. The first component includes a body that has a central post. The body comprises a longitudinal tab, and the longitudinal tab comprises a securing clip. The first component also includes a head that is connected to an upper longitudinal end of the body and comprises an upper collar. The first component further includes a retainer at a lower longitudinal end of the body. The retainer includes two fingers transvers and diametrically opposite one another relative to a longitudinal axis of the body. At least one of the fingers extends to an upper surface that defines a plane transverse to the body. The plane defined by the upper surface of the at least one finger extends through a portion of the securing clip.

According to some embodiments, the second component includes at least one cam surface and the first component includes at least one follower positioned underneath the upper collar. The at least one follower is configured to cooperate with the at least one cam surface to transform a rotational movement of the first component into a longitudinally-upwards translation movement of the first component in relation to the second component so that the retainer bears on a lower surface of one of the units. In other embodiments, each of the two fingers comprise at least one notch extending therein. In some embodiments, the longitudinal tab comprises an upper end connected to the body and a free lower end. The free lower end of the longitudinal tab includes the securing clip.

BRIEF DESCRIPTION OF SEVERAL VIEWS OF THE DRAWINGS

FIG. 48 illustrates a perspective bottom view of a first component, according to an embodiment of the present disclosure.

FIG. 49 illustrates a perspective top view of a second component, according to an embodiment of the present disclosure.

FIG. 50 illustrates a transverse cross-sectional view of a device in which a first component is separated from a second component, according to an embodiment of the present disclosure.

FIG. 51 illustrates a transverse cross-sectional view of a device including a first component coupled to a second component in a pre-assembled position, according to an embodiment of the present disclosure.

FIG. 52 illustrates a perspective top view of a device in a pre-assembled position, according to an embodiment of the present disclosure.

FIG. 53 illustrates a perspective bottom view of a device in a pre-assembled position, according to an embodiment of the present disclosure.

FIG. 54 illustrates a transverse cross-sectional view of a pre-assembled device separated from a unit, according to an embodiment of the present disclosure.

Figure 1:
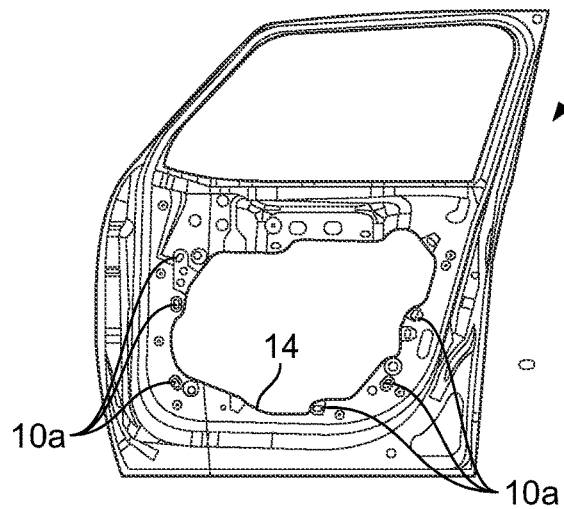
FIGS. 1 and 2 are diagrammatic views in perspective, of a door structure and a door module respectively, which form units within the meaning of embodiments of the present disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a device for securing at least two units, such as a door module and a door structure of a motor vehicle. In at least one embodiment, the device includes a first component including a body and a head. The body has a generally elongated shape and is designed to be inserted in a first orifice of a first one of the units then in a second orifice of a second one of the units and includes at one lower longitudinal end retainer that is designed to bear against a lower surface of the second unit. The head is connected to an upper longitudinal end of the body and includes a part for engagement with a rotation tool of the first component. A second component is made from a single piece with one of the units or designed to be fixed on to an upper surface of the unit, and with the first component passing through it. At least one of the first and second components includes at least one cam surface and the other of the first and second components includes at least one follower that is configured to cooperate with the at least one cam surface, and to transform a rotational movement of the first component into a longitudinal translation movement of the first component in relation to the second component upwards so that the retainer comes to bear on the lower surface of the second unit.

Unlike prior known devices, the rotation of the first component is designed to cause the first component to translate upwards, not downwards. The upward translation of the first component allows the retainer to come to bear against the lower surface of the second unit. It is then understood that the retainer is advantageously distanced in a longitudinal direction from the second unit. The distancing allows for the retainer not to come into contact with the aforementioned burs when the first component rotates, and hence not to be impeded by them. The retainer therefore avoids the risk of being damaged by the burs when the first component rotates.

Further, the direct cooperation (by means of the follower and the cam surface) between the first component and the second component or the first unit does not cause the second unit to intervene. This is advantageous, in particular when the first component and the first unit are made from similar materials, for example plastic, while the second unit is made from a different material, for example metal.

This is further advantageous, as this makes it possible to reduce the torque necessary to the rotation of the first component and to the compression of the seal when such a seal is inserted between the units. Indeed, with the prior art, the torque had to be sufficient to overcome the compressive stress of the seal and the torsional loading, which could be significantly increased by the friction forces between the first component and the second unit. With respect to certain embodiments of the present disclosure, the compressive stress must only be overcome after the retainers come to bear against the second unit, which allows better distribution of the torque to be supplied during the rotation of the first component.

In at least one embodiment, the device includes one or several of the following characteristics, taken in isolation from each other or combined with one another:

The retainer may be of the hammer type and include at least one substantially transverse finger and include at least one upper surface designed to bear against the lower surface of the second unit.

The retainer may include two fingers diametrically opposite one another relative to a longitudinal axis of said body.

The upper surface of the finger or of each finger may extend substantially in a plane transverse to the body, and is connected to a surface inclined relative to the plane and designed to facilitate the rotation of the first component.

The body may include an elastic latch configured to cooperate with complementary portions of the second component and/or of the second unit so as to hold the first component in a depressed position in the second component and/or the second unit, in which a depressed position of the head is longitudinally distanced from the second unit and/or from said second component.

The at least one cam surface may be supported by or formed on the second component or second unit.

In at least one embodiment, the second component or second unit includes two cam surfaces diametrically opposite one another relative to an axis of rotation of the first component.

Each cam surface may have a circumferential orientation around an axis of rotation of the first component and is oriented upwards and faces the first component.

Each cam surface may extend between a substantially flat transverse upper surface of the second component or unit and a recess for accommodating the follower.

The at least one follower may be supported by or formed on the first component.

The first component may include two followers diametrically opposite one another relative to an axis of rotation of the first component.

Each follower may include a protruding piece including a lower cylindrical surface configured to cooperate, by sliding, with a corresponding cam surface.

The second component is independent of the second unit and includes a slot for passage of the body of the first component.

The second component may include an elastic latch designed to cooperate with complementary portions of the second unit.

At least some of the orifices and slot may have a generally elongated shape in the transverse direction.

At least some of the orifices and slot may have a shape including a central part of a generally circular shape, and two eyes, lateral and diametrically opposite one another, of a generally rectangular shape.

At least one of the first and second components may include a seal for ensuring sealing between the first and second components and/or between the second component and second unit.

The first component may include first and second circumferential stops that are configured to cooperate with complementary portions of the second component so as to define an end of rotational travel positions of the first component in relation to the second component.

The first component may include two first flanges of circumferential orientation and diametrically opposite one another. Each of the flanges includes circumferential ends configured to abut circumferentially on the complementary portions of the second component.

The second component may include two second flanges of circumferential orientation and diametrically opposite one another. Each of the flanges includes a circumferential stop end configured to cooperate by abutting with a circumferential end of a first flange of the first component, and an opposite circumferential end defining a housing for accommodating a circumferential end of the other of the first flange of the first component.

The second flanges may be radially movable outwards by elastic deformation, through action of the first flanges during movement in translation of the first component in relation to the second component from a position in which the first flanges are situated above the second flanges to a position in which the first flanges are situated below the second flanges, and are, for example, situated in housings defined by the second flanges.

Each of the first flanges of the first component may be held in the housing by a protrusion made on the second component, and on which one circumferential end of a first flange of the first component is supported in the circumferential direction. The protrusion forms a stiff point during unlocking of the first component in relation to the second component by rotating the first component in relation to the second component.

Certain embodiments of the present disclosure also relate to a method of securing at least two units, such as a door module and a door structure of a motor vehicle, through a device as described above. The method includes: a) inserting the body of the first component in a first orifice of a first one of the units then in a second orifice of a second one of the units until the retainer of the body is longitudinally distanced from the lower surface of the second unit, b) rotationally moving the first component in relation to the second component so that the at least one follower and the at least one cam surface cooperate with each other, and so that the first component is moved upwards in relation to the second component, until the retainers come to bear against the lower surface of the second unit.

Step a) may include a sub-step of longitudinal movement of the first component in relation to the second component, from a distanced position in which the first component is held by elastic latching through cooperation with the second component and/or the second unit to a closer position in which the first component is held by elastic latching through cooperation with the second component and/or the second unit.

Step b) may include a sub-step of rotational movement of the first component in relation to the second component, from the closer position in which the at least one follower and the at least one cam surface are not yet cooperating with each other, to a position in which the at least one follower and the at least one cam surface cooperate or have cooperated, and the retainers are bearing against the lower surface of the second unit. The first component may be rotationally moved by a quarter turn at step b).

At step a), the body may be inserted in the first orifice and/or the second orifice, either by longitudinal translation in a direction substantially parallel to the axis of the orifice or orifices, or by longitudinal translation in a direction inclined relative to the axis, then by pivoting in a plane passing though the axis.

Certain embodiments of the present disclosure provide a fastening clip device that is configured to securely and effectively connect a door module to a door frame of a vehicle. The fastening clip device is configured to efficiently connect the door module to the door frame.

Figure 2:
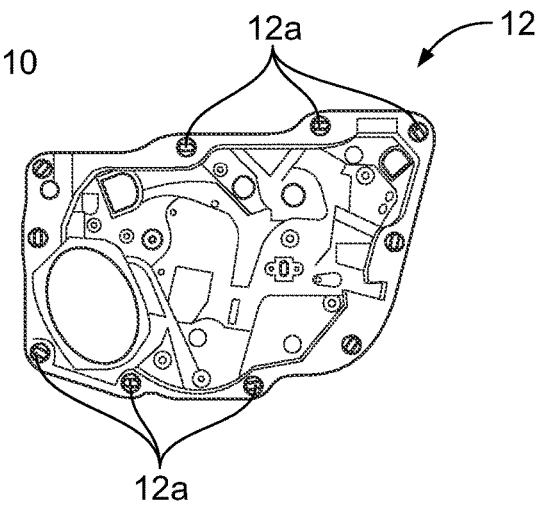
Figure 3:
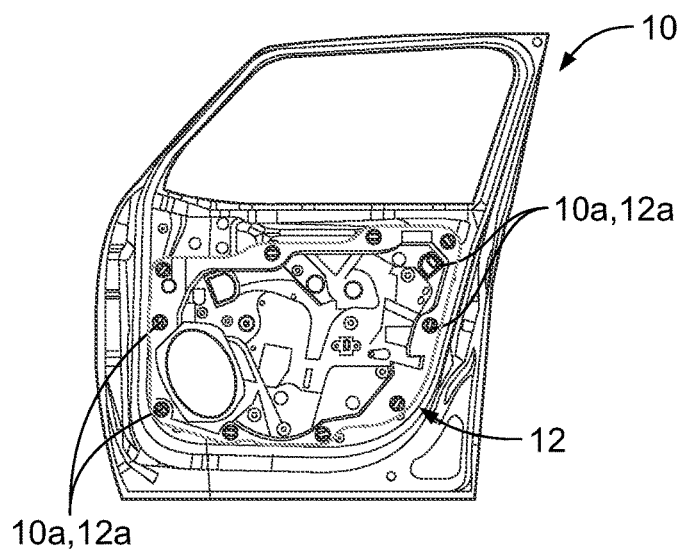
FIG. 3 is a diagrammatic view of the installation formed by the door structure and the door module of FIGS. 1 and 2.
Figure 4:
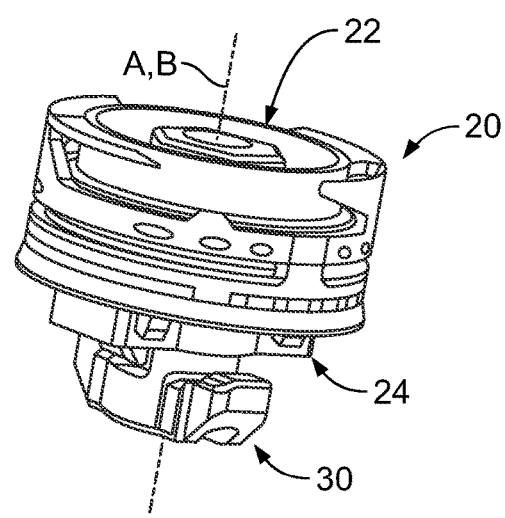
FIG. 4 is a diagrammatic view in perspective of a first embodiment of a securing device according to an embodiment of the present disclosure.

FIGS. 1 to 3 show units to which the securing device can be applied, according to an embodiment of the present disclosure. The units are a door structure 10 shown in FIG. 1 and a door module 12 shown in FIG. 2. FIG. 3 shows the units (namely, the door structure 10 and the door module 12) in the assembled position. The units form part of a motor vehicle door.

The door structure 10 includes an upper part forming a frame designed to extend around a side window of the vehicle, and a lower part including a cutout 14. The cutout 14 is designed to be filled at least partially by a panel formed by the door module 12.

The door structure 10 and door module 12 can be made of metal or plastic material. They are superimposed one on the other and secured by at least one device (such as a fastening clip) according to an embodiment of the present disclosure. For this purpose, the structure 10 and module 12 include substantially aligned orifices for installing the devices. Each device is designed to be installed through an orifice 10a of the door structure 10 and a substantially aligned orifice 12a of the door module 12. In the description that follows, the door module 12 is considered the first unit, and the door structure 10 considered as the second unit.

Figure 10:
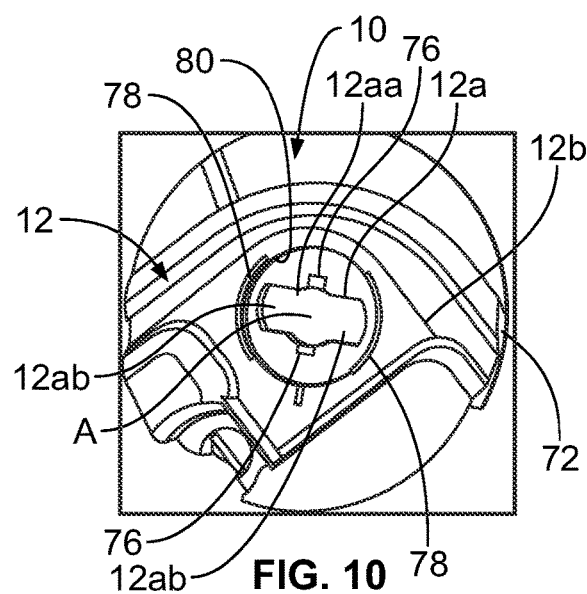
FIGS. 10 and 11 are partial diagrammatic views in perspective of a door structure and a door module, and respectively show an upper surface of the door module and a lower surface of the door structure.
Figure 11:
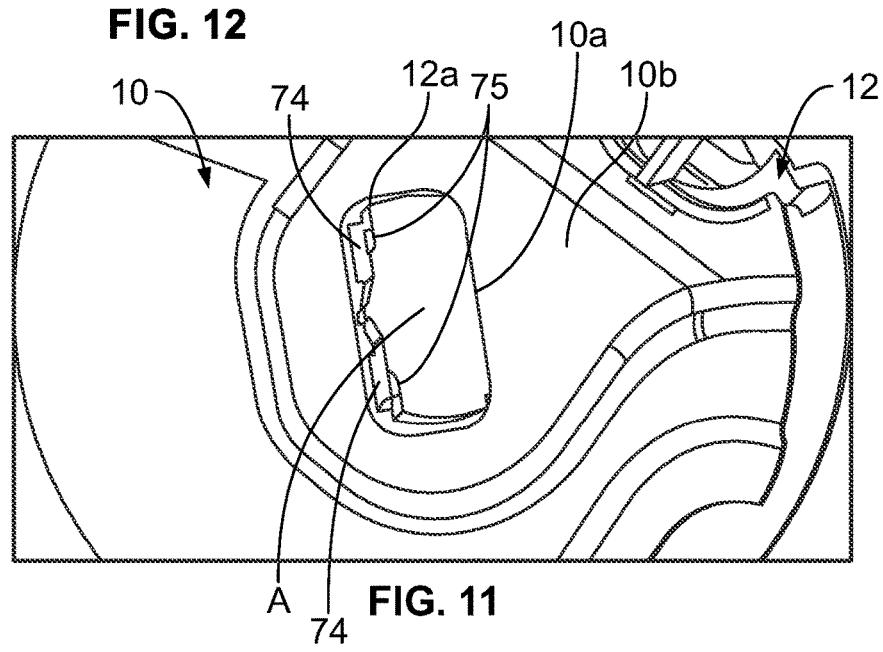

FIGS. 4 to 19 show a device 20 or fastening clip device according to an embodiment of the present disclosure. The device 20 includes two components 22, 24 in engagement with one another. In the example shown, the second component 24 is independent of the first unit, namely the door module 12. The component 24 is designed to be attached to an upper surface 12b (the surface is qualified as upper for better understanding—but can be any surface in the assembled position on a vehicle, for example) of the door module 12, so that a slot 24a of the component 24 is substantially aligned with a first orifice 12a of the module 12, which is substantially aligned with a second orifice 10a of the structure 10 (FIGS. 7, 10 and 11).

The slot 24a and the orifices 12a, 10a can have substantially the same shape, namely an elongated shape. Each of the slot 24a and the orifices 12a, 10a can include a central part 24aa of generally circular shape, and two lateral eyes 24ab, which are diametrically opposite one another relative to an axis A (of alignment) of the slot 24a and of the orifices 12a, 10a. Each eye 24ab has a generally rectangular shape.

Figure 5:
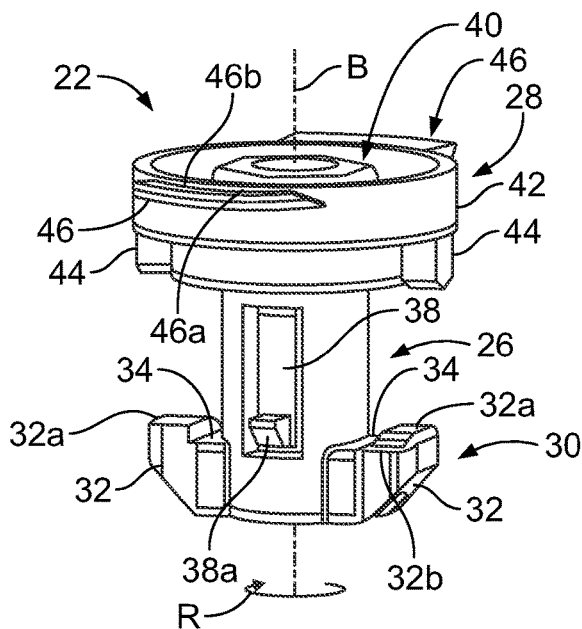
FIGS. 5 and 6 are diagrammatic views in perspective of a first component of the device of FIG. 4.
Figure 6:
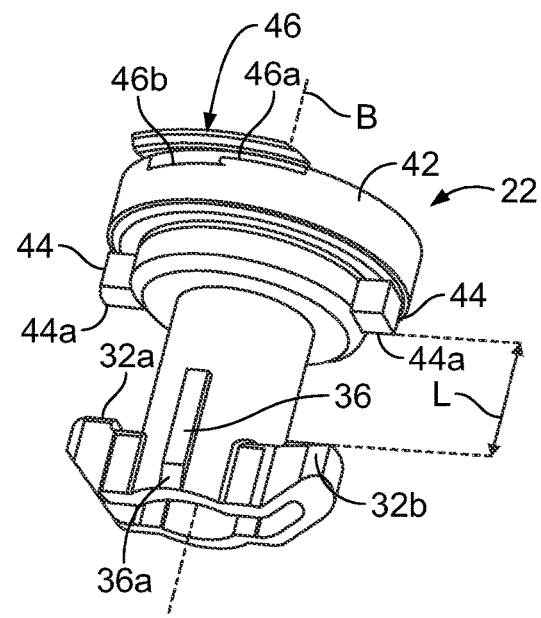
Figure 7:
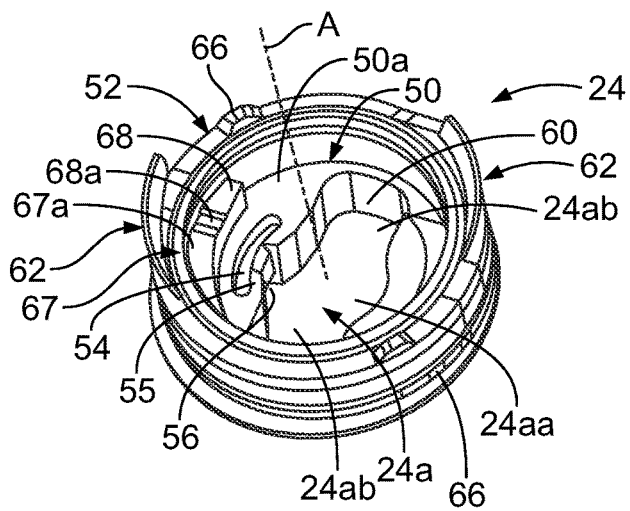
FIGS. 7 and 8 are diagrammatic views in perspective of a second component of the device of FIG. 4.
Figure 8:
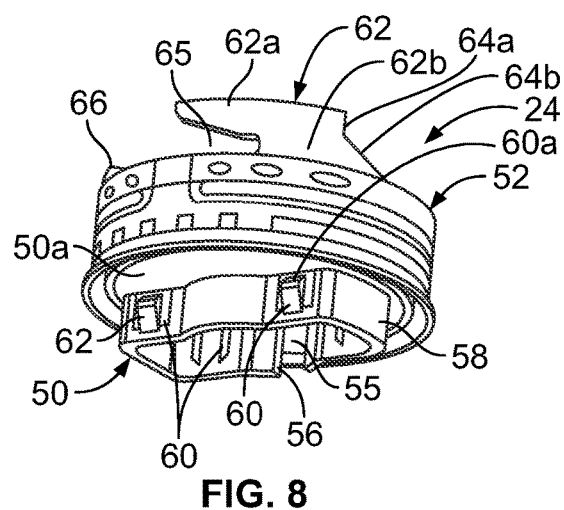

The first component 22, shown alone in FIGS. 5 and 6, includes a body 26 and a head 28. The body 26 has a generally elongated shape and is designed to be inserted in the slot 24a and the orifices 10a, 12a. The body 26 has a substantially generally cylindrical shape, and more particularly, cylindrical and tubular. The body 26 is connected by its upper longitudinal end to the head 28 and includes at its lower longitudinal end one a retainer 30 that is configured to bear against a lower surface 10b of the second unit, namely the structure 10 (FIG. 11).

The retainer 30 includes two fingers 32, transverse and diametrically opposite one another relative to the longitudinal axis B of the body. In the example shown, each finger 32 has a generally parallelepiped shape. Each finger 32 includes a substantially flat upper surface 32a oriented upwards (that is, towards the head 28). The surfaces 32a of the fingers extend substantially in the same transverse plane perpendicular to the axis B.

Each finger 32 further includes a surface 32b inclined relative to the aforementioned plane. The surface 32a of each finger is connected by an edge to the surface 32b of the finger, which extends downwards from the surface 32a. The direction of rotation of the component 22 in the component 24 is denoted R. The surfaces 32b are arranged upstream of the surfaces 32a relative to this direction of rotation. That is, they are prone to cooperate firstly with complementary surfaces of the structure 10 when the component 22 rotates in the component 24 and in the orifices 10a, 10b. The surface 32a of each finger is separated from the outer cylindrical surface of the finger 32 by a transverse groove 34.

The body 26 includes an elastic latch that is configured to cooperate with complementary means of the component 24. The latch includes longitudinal tabs 36, 38 supporting at one of their ends a latching hook 36a, 38a. The body 26 includes a first longitudinal tab 36 protruding on its outer cylindrical surface and extending from the lower end of the body substantially up to its mid-height (FIG. 6). The hook 36a is situated at the lower end of the tab 36. The tab 36 is formed by a radial excess thickness of the body 26. The tab 36 is situated substantially at an angular mid-distance (at 90° respectively in relation to the axis B) from the fingers 32.

The body 26 includes a second longitudinal tab 38, substantially diametrically opposite relative to the tab 36. It is formed in the thickness of the tubular side of the body and includes an upper end connected to the tubular side, and a free lower end supporting the hook 38a. The tab 38 is elastically deformable in flexion in a plane passing substantially through the axis B.

The hooks 36a, 38a extend radially outwards in relation to the axis B. The radially outer free ends are situated on a circumference having a diameter larger than the outside diameter of the body.

The head 28 of the component 22 includes a central part 40 configured to engage with a rotation tool of the first component 22 in relation to the second component 24, around the axis B. The central part 40 has an outer periphery with a generally hexagonal shape and includes at its center (aligned on the axis B) a cutout with a transverse section in the shape of a star in the example shown.

The central part 40 is surrounded by a tubular cylindrical collar 42 of axis B. Followers 44 are provided at the junction between the collar 42 or the head 28 and the body 26. Two followers 44 are diametrically opposite one another relative to the axis B. In the example shown, they are aligned in the longitudinal or axial direction with the fingers 32.

Each follower 44 has a generally parallelepiped shape, of which one lower surface 44a is a convex curve and designed to cooperate, by sliding, with a cam surface, which will be described below. Each surface 44a represents a portion of a cylindrical surface whose axis of rotation is an axis radial or transversal to the axis B. The surfaces 44a of the followers 44 are situated substantially facing the surfaces 32a of the fingers 32 and are longitudinally spaced from the surfaces by a distance L. The radially outer ends of the followers 44 are substantially aligned with the outer cylindrical surface of the collar 42.

The collar 42 is connected at its outer periphery and at its upper end to two diametrically opposite flanges 46. Each flange 46 has a general L shape, which extends in a plane substantially transversal to the axis B. Each flange 46 includes a first branch 46a with a circumferential orientation, which extends around the axis B, distanced from the outer periphery of the collar 42, and a second branch 46b with a radial orientation, which connects a circumferential end of the first branch 46a to the outer periphery of the collar. The other circumferential end of the branch 46a is free. The circumferential ends of the flange 46 form or include stop surfaces, oriented here in planes passing through the axis B as will be described in more detail below.

In the example shown, the component 22 is made from a single piece, preferably of a plastic material. The second component 24, shown alone in FIGS. 7 and 8, includes a base 50 and a skirt 52. The base 50 includes a side 50a, substantially flat and with a circular peripheral contour, which substantially includes at its center the aforementioned slot 24a (FIG. 7). The slot 24a opens out on the two faces, respectively upper and lower, of the side 50a of the base. The side 50a includes a cleft 54 in an arc, which extends around the central part 24aa of the slot 24a. The cleft 54 passes through the side 50a and has an angular extent of between 30° and 60°. The circumferential ends of the cleft are oriented respectively towards the eyes 24ab of the slot. The cleft 54 defines, around the central part 24aa of the slot, a strip of material 55 of a shape generally curved around the axis A. The strip is elastically deformable, in particular when a radial force is applied to it. A longitudinal groove 56 is formed on the radially inner face of the strip of material 55 and opens out at its lower end in a notch 57 formed in the strip of material. The notch 57 radially passes through the strip of material 55. In the example shown, the notch 57 is designed to accommodate, by elastic latching, the hook 36*a* of the tab 36 in a particular installation position of the device, which will be described below.

The base 50 includes on its lower face a rim 58, which extends downwards over the entire perimeter of the outlet of the slot 24. This rim 58 can therefore have a general shape similar to that of the slot and also of the orifices 10*a*, 12*a*. This rim 58 is further configured to be inserted or slotted in the orifice 12*a* of the module and to be held in this orifice by elastic latching.

The rim 58 includes tabs 60 formed in its thickness and including hooks 60*a* oriented radially outwards. The tabs 60 are elastically deformable in flexion and have a longitudinal general orientation. The lower ends of the tabs are connected to the rim 58 and their upper ends include or support the hooks 60*a*. The tabs 60 and hooks 60*a* are situated on portions of the rim 58 that are situated in the longitudinal extension of the sides facing the eyes 24*ab* of the slot 24. There may be four tabs 60, for example.

The skirt 52 extends upwards from the outer periphery of the base 50. The skirt 52 has a cylindrical tubular general shape of axis A.

Figure 14:
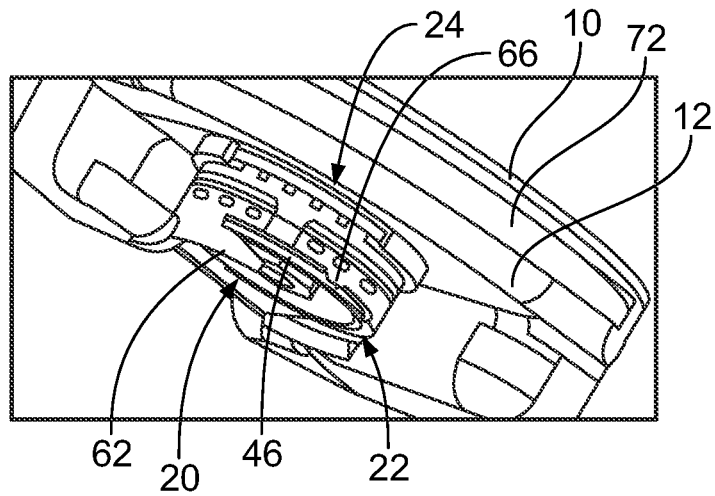

The skirt 52 is connected at its upper end to two diametrically opposite flanges 62. Each flange 62 has a general L shape and extends substantially upwards in the extension of the tubular side of the skirt. Each flange 62 includes a first branch 62*a* with a circumferential orientation, which extends around the axis A, distanced from the upper end of the tubular side of the skirt, and a second branch 62*b* with a longitudinal orientation, which connects a circumferential end of the first branch 62*a* to the upper end of the skirt. The other circumferential end of the branch 62*a* is free. The circumferential end of the branch 62*a* connected to the branch 62*b* forms or includes a stop surface 64*a*, oriented circumferentially in a plane passing through the axis B. The stop surface 64*a* is connected to the upper peripheral surface of the skirt by an inclined ramp surface 64*b*. The branch 62*a* and in particular its free circumferential end extends away from the upper end of the tubular side of the skirt, and defines with it a housing 65 for accommodating a flange 46 of the first component 22 as shown in FIG. 14 and as will be described in more detail below.

Substantially midway between the flanges 62, and diametrically opposite one another relative to the axis A, the component 24 includes two protrusions 66 on the upper peripheral surface of the skirt 52. The protrusions 66 are designed to cooperate with the free circumferential ends of the flanges 46 of the component 22 so as to hold them in a position in which they are accommodated in the aforementioned housings 65 defined by the flanges 62 of the component 24.

Two ramps 67, diametrically opposite one another and with circumferential orientation around the axis B, are provided radially inside the skirt 52, and at the junction between the skirt 52 and the base 50. Each ramp 67 defines a cam surface 67*a*, which is oriented upwards and extends from the upper face of the side 50*a* of the base 50 up to a plateau 68 substantially parallel to the side 50*a*. The plateau 68 includes a recess 68*a* oriented upwards, which is situated at the upper end of the corresponding cam surface 67*a*.

The followers 44 of the component 22 are configured to cooperate, on the one hand, by sliding, with the cam surfaces 67*a* and, on the other hand, by slotting or elastic latching, with the recesses 68*a*. When the component 22 rotates in relation to the component 24, the followers 44 slide on the cam surfaces 67*a*, substantially over their entire angular extent. The followers 44 terminate their travel in the recesses 68*a*, which define an angular locking position of the component 22 in relation to the component 24, around the axes A, B. In the example shown, this travel represents a quarter turn. In other words, the ramps 67 each have an angular extent equal at the most to 90°.

The cooperation of the followers 44 with the cam surfaces 67*a* results in a longitudinal translation movement of the first component 22 in relation to the second component 24 upwards, and therefore on the one hand and axial distancing of the head 28 from the base 50, and an axial convergence of the retaining fingers 32 to the base 50.

Figure 9:
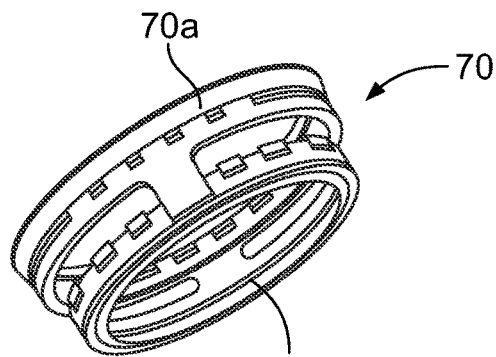
FIG. 9 is a diagrammatic view in perspective of sealing means of the device of FIG. 4.

FIG. 9 shows a seal or sealing means 70 of the component 24, which can be made by overmolding an elastic material on the rest of the component 24. The rest of the component is preferably made from a single piece, for example of a plastic material. In the example shown, the seal 70 includes in particular two rings 70*a*, 70*b* respectively configured to ensure peripheral sealing at the lower end of the component 24, between this end (and more precisely at the outer periphery of the side 50*a* of the base 50 in the example shown) and the surface 12*b* of the module 12 on which the device is attached, and at the upper end of the component 24, between this end and the outer periphery of the head 28 or of the collar 42 of the component 22. In the example shown, the head 28 and the collar 42 of the component 22 can be accommodated in the skirt 52 of the component 24, which thus includes at its inner periphery the sealing ring 70*b*.

FIGS. 10 and 11 show units to be assembled, namely the aforementioned door module 12 and door structure 10. The units are partially shown here. The units are stacked one on the other with interposition of a seal 72 between them. The units are stacked so that the orifices 10*a*, 12*a* are aligned with one another for assembling the securing device or devices 20, as mentioned previously.

The seal 72 is a peripheral seal, which forms, for example, a closed loop, and can extend substantially over the entire perimeter of the door module 12. In the example shown, it is affixed to the door structure 10. The seal 72 is made from an elastically deformable material and is designed to be compressed between the units on installation and in particular when the device or devices are tightened. Tightening is obtained by rotating the first component 22 in relation to the second component 24 for each device 20, as will be described in more detail below. After the device or devices 20 has/have been tightened, the seal 72 is held compressed and therefore constrained between the units 10, 12.

In the example shown, the orifice 10*a* of the door structure has a generally rectangular shape whose corners are rounded (FIG. 11). The orifice 12*b* of the door module 12 has a similar shape to that described previously, and includes a central part 12*aa* between two diametrically opposite eyes 12*ab*. Each eye 12*ab* includes two facing straight peripheral edges, each of which includes an arrangement 74 configured to cooperate, by elastic latching, with the hooks 60*a* of the tabs 60 of the second component 24. This arrangement 74 can be in the form of a longitudinal notch opening out towards the inside of the eye 12*ab* and downwards (towards the structure 10). The notch does not open out upwards and on the contrary is closed at its upper end by a web 75 so as to form an elastic latching stiff point.

The door module 12 includes, on its upper surface 12*b* opposite the door structure 10, two radial notches 76, diametrically opposite one another and extending towards the outside from the peripheral edges of the central part 12aa of the orifice 12a. The surface 12b further includes an annular rib 78 extending around the axis A of the orifice 12a and able to serve for guiding the device 20 during its installation, and even for adjusting it. An imprint 80 formed as a hollow in the upper surface 12b of the unit 12 makes it possible to perfect this adjustment.

Figure 12:
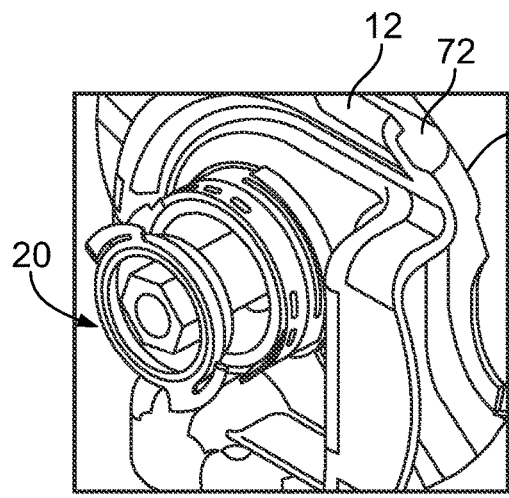
FIGS. 12 to 19 are partial diagrammatic views in perspective of the door structure and module of FIGS. 10 and 11 and the securing device of FIG. 4, and show positions and installation and securing steps of the device.
Figure 13:
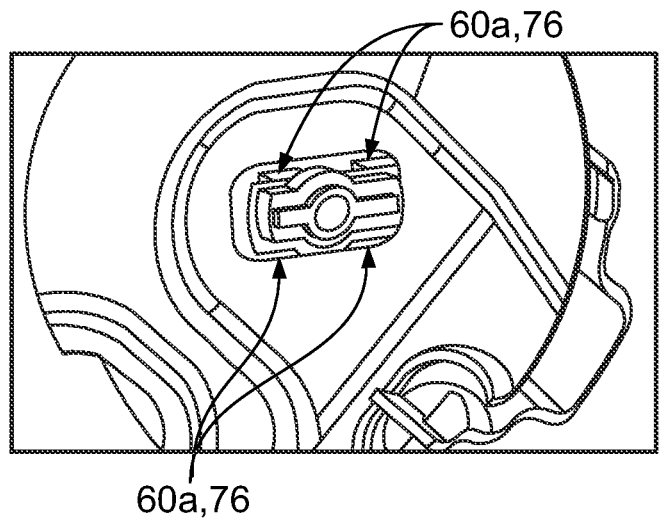

FIGS. 12 and 13 illustrate a pre-installation or pre-assembly position of the device 20 in the orifices 10a, 12a of the units 10, 12. This position can, for example, be used when the units 10, 12 are delivered. The advantage of this solution is that the device 20 is inserted in the orifice 12a of the module and made integral with this module without the lower end of the device axially passing beyond the lower surface of the module or beyond a transverse plane passing substantially through the lower ends of the module. It is then understood that the module 12, with the pre-assembled device or devices 20, can be stacked and moved on the door structure 10 for centering without the device or devices 20 hampering these operations. In the example shown, this is made possible by the tabs 60 with hooks 60a of the second component 24, which cooperate, by elastic latching, with the notches of the orifice 12a.

The pre-assembly position is obtained first by inserting the first component 22 in the second component 24. For this purpose, the axes A, B are aligned and the fingers 32 of the component 22 are arranged facing the eyes 24ab of the slot 24, in the longitudinal direction. The component 22 is then moved in axial translation in the component 24 until the hook 36a of the tab 36 of the body 26 cooperates, by elastic latching, with the notch 56 of the base 50. The components 22, 24 are then pre-assembled one inside the other.

The fastening clip or device 20 is placed above the orifice 12a of the module and aligned on its axis. The device 20 is then moved in translation into the orifice 12a until the hooks 60a of the tabs 60 of the base 50 cooperate with the arrangements 74 or notches of the orifice 12a of the module 12. The assembly shown in FIGS. 12 and 13 is then obtained, the head 28 of the first component 22 having a position axially distanced from the second component 24. The second component 24 is bearing, via the seal 70, on the surface 10b, at the imprint 80 radially inside the rib 78. The module 12 equipped with the device or devices 20 can then be positioned without difficulty on the door structure 10 to be secured to it.

Figure 15:
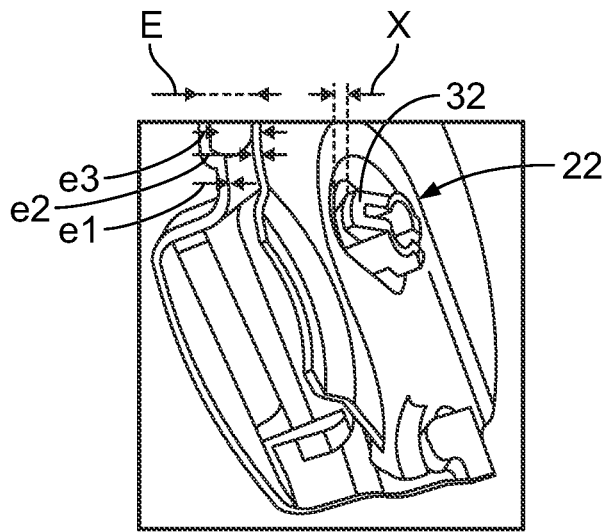
Figure 20:
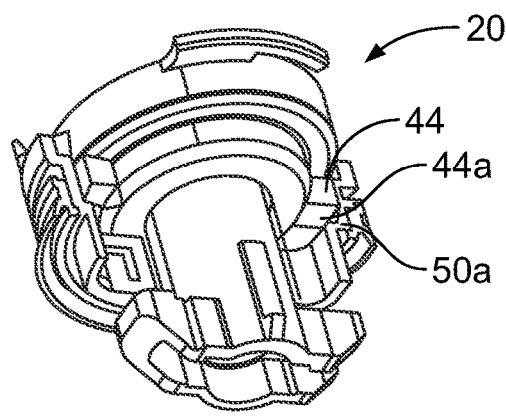
FIGS. 20 to 25 are diagrammatic views in perspective and with partial separation of the device of FIG. 4, and show steps and positions of its first component in its second component.
Figure 21:
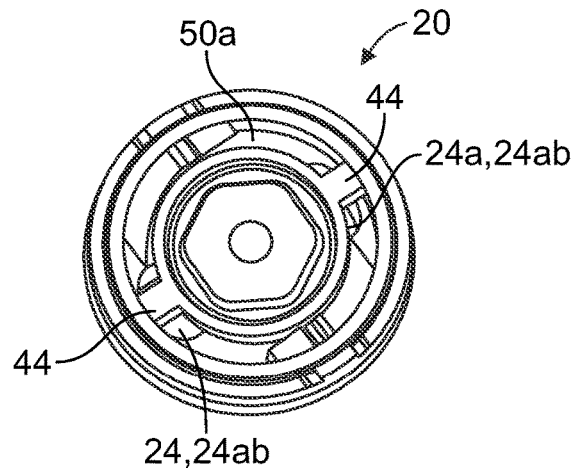

FIGS. 14 and 15 illustrate another position, called a depressed position, of the device 20 in the orifices 10a, 12a of the units 10, 12. The depressed position results from a longitudinal translation of the first component 22 in the second component 24, from the position shown in the two preceding figures. This movement is made until the followers 44 of the first component 22 bear against the upper surface of the side 50a of the base 50 of the second component 24, here radially outside the eyes 24ab of the slot 24 (see FIGS. 20 and 21). During this movement, the flanges 46 of the first component 22 come, initially, into axial contact with the flanges 62 of the second component 24, as they are at least partially axially opposite one another in the preceding position (FIG. 12). The translation force applied to the first component 22 in order to move it is sufficient for the flanges 46 to come to bear and elastically deform the flanges 62 radially outwards.

The force is maintained until the flanges 46 engage under the flanges 62 in the aforementioned housings 65. It is therefore understood that, due to the elastic deformation of the flanges 62, the engagement of the flanges 46 in the housings 65 and the passage from the position of FIGS. 12 and 13 to the position of FIGS. 14 and 15 is made by elastic latching.

In the depressed position, the flanges 46 circumferentially abut or are separated by weak circumferential clearances on the one hand from the bases of the housings 65 and on the other hand from the protrusions 66 (FIG. 14). This makes it possible to hold the component in this position in relation to the component 22.

FIG. 15 makes it possible to appreciate the fact that, in the assembled position, the fingers 32 of the first component 22 are axially distanced from the lower surface 10b of the structure 10. The transverse plane passing through the surfaces 32a of the fingers is in fact at axial distance X from the plane passing through the outlet of the orifice 10a on the surface 10b. This is made possible by the fact that the aforementioned distance L (FIG. 6) is greater than the combined thickness E of the module 12 (thickness e1), of the structure (thickness e2) and of the seal 72 (thickness e3) in the uncompressed state, at the orifices 10a, 10b (E=e1+e2+e3). Notably, X=L−E.

Figure 16:
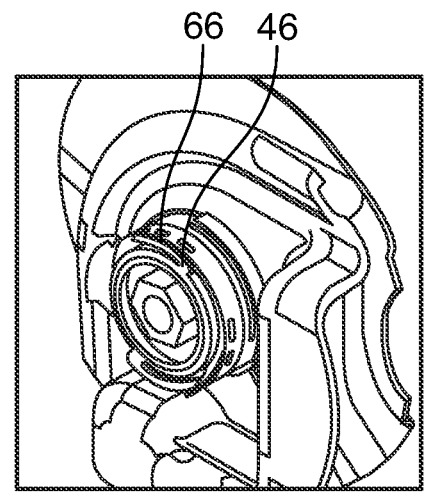
Figure 17:
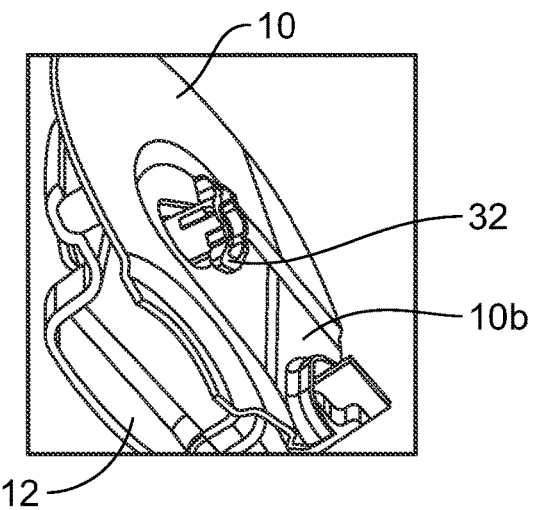
Figure 18:
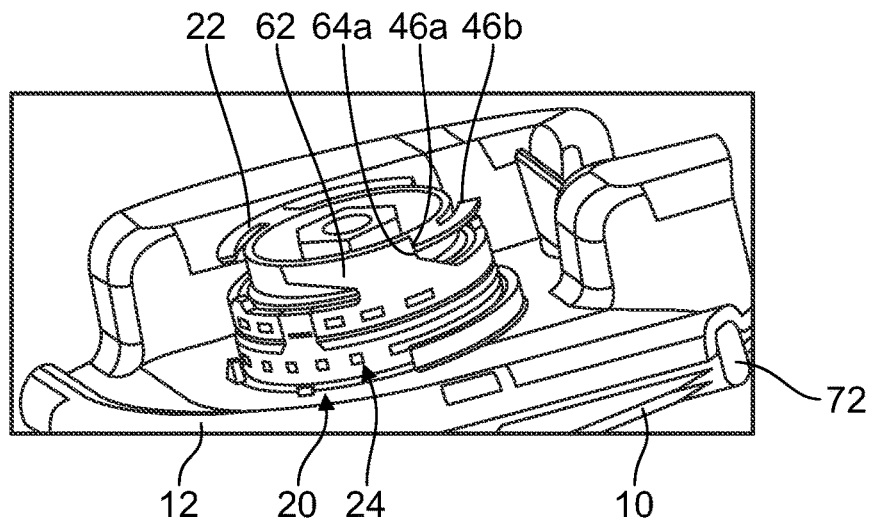
Figure 19:
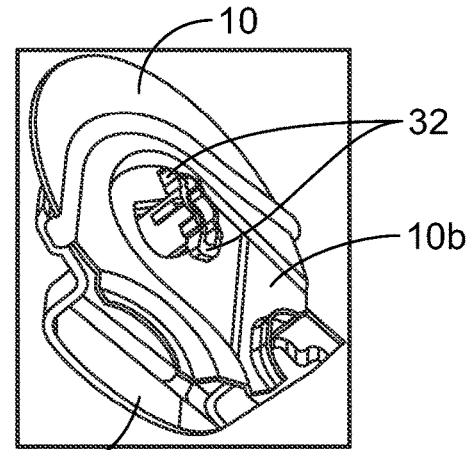

FIGS. 16 to 19 illustrate rotation steps of the first component 22 in the second component 24. FIGS. 16 and 17 illustrate an intermediate position in which the component 22 is moved by an eighth of a turn (45°) relative to the depressed position of FIGS. 14 and 15. FIGS. 18 and 19 illustrate a final position in which the component 22 is moved by an additional eighth of a turn (45°) relative to the aforementioned intermediate position, namely one quarter turn in total (90°).

Figure 22:
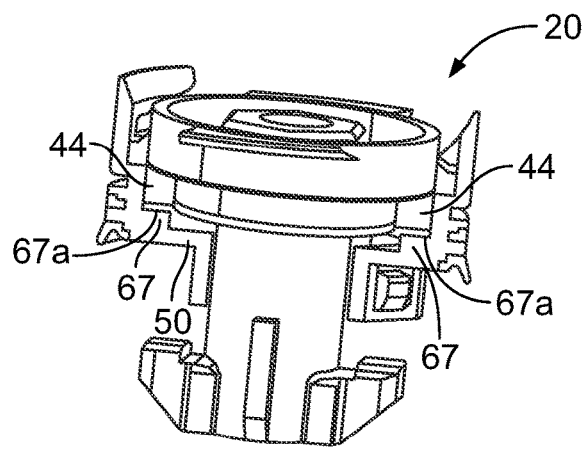
Figure 23:
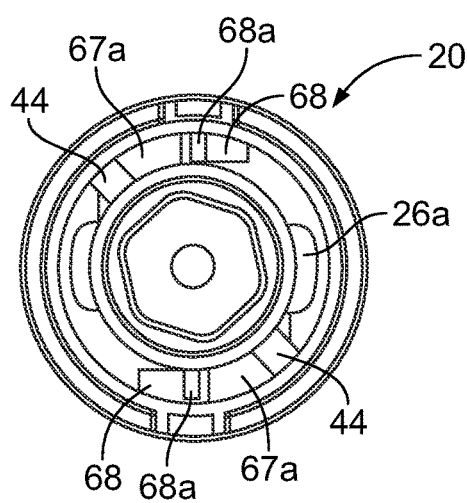

The rotation of the component 22 can be carried out via a tool designed to engage the part 40 of the head 28. The movement of the component 22 from the position of FIGS. 14 and 15 to that of FIGS. 16 and 17 is caused by passing the stiff points defined by the circumferential pressure of the flanges 46 on the protrusions 66. Sufficient torque is applied so that the circumferential ends of the branches 46a, connected to the branches 46b of the flanges 46, pass the stiff points. From this moment on, the followers 44 of the component 22 cooperate, by sliding, with the cam surfaces 67a of the ramps, which causes an upward translation movement of the component 22 to start (FIGS. 22 and 23).

The fingers 32, and in particular their surfaces 32a, 32b, come closer to the surface 10b of the structure and can come into contact therewith and slide thereover. The torque applied for starting the rotation of the component does not therefore serve to compress the seal 72.

Figure 24:
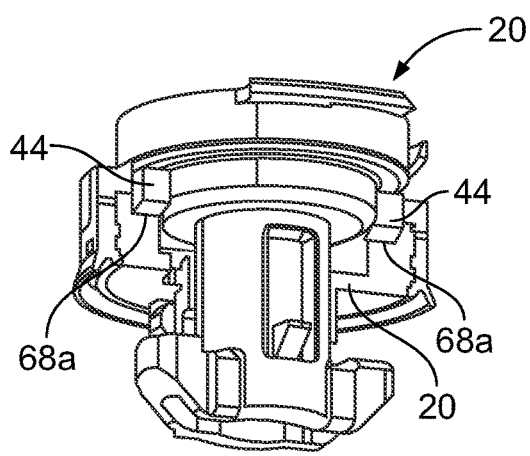
Figure 25:
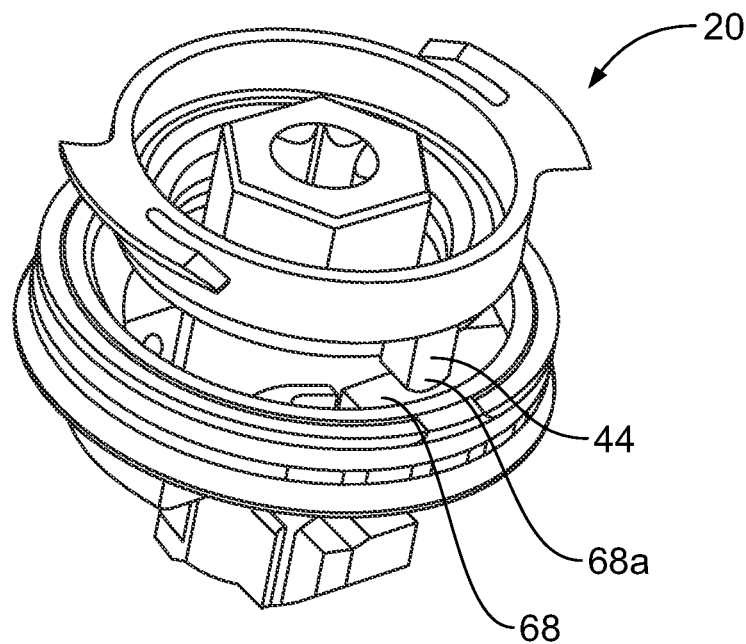

The rotation of the component 22 continues until the followers 44 engage by elastic latching in the recesses 68a of the plateaus 68 of the component 24 (FIGS. 24 and 25). The circumferential ends of the branches 46a, connected to the branches 46b of the flanges 46, are guided by the ramp surfaces 64b and circumferentially abut on the surfaces 64a of the flanges 62 (FIG. 18). The fingers 32 bear with their surfaces 32a on the surface 10b (FIG. 19). The device 20 is then in a secured position.

FIGS. 26 to 39 show a device 20' according to an embodiment of the present disclosure. The device 20' includes two components 22', 24' in engagement with one another. In the example shown, the second component 24' is integral with the first unit, namely the door module 12', and is formed in particular from a single piece with the latter, for example of a plastic material (FIG. 30).

The slot 24a' of the component 24' is combined here with the orifice 12a' of the module. The orifice 12a' has substantially the same shape as described previously, namely an elongated shape. The orifice 12a' includes a central part 12aa' of a generally circular shape and two lateral eyes 12ab' diametrically opposite one another relative to the axis A of the orifice. Each eye 12ab' has a generally rectangular shape.

Figure 26:
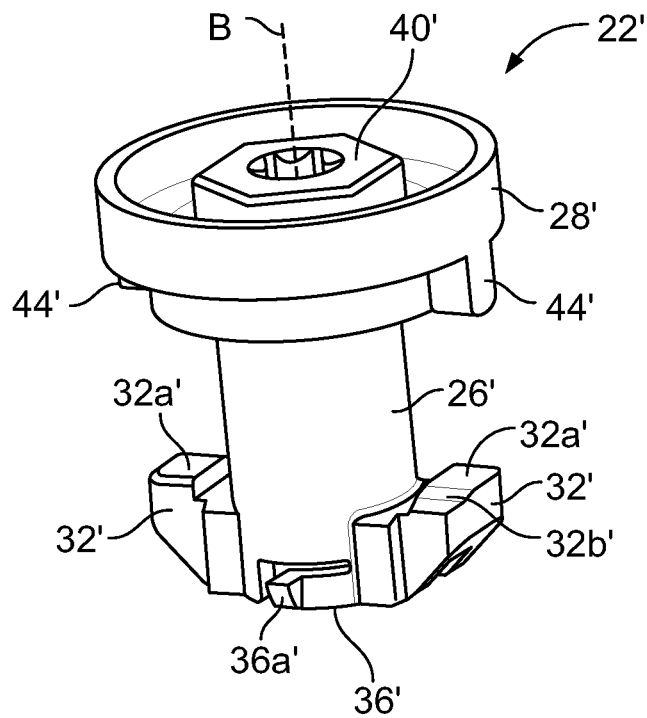
FIGS. 26 and 27 are diagrammatic views in perspective of a first component of an embodiment variant of the securing device according to the invention.
Figure 27:
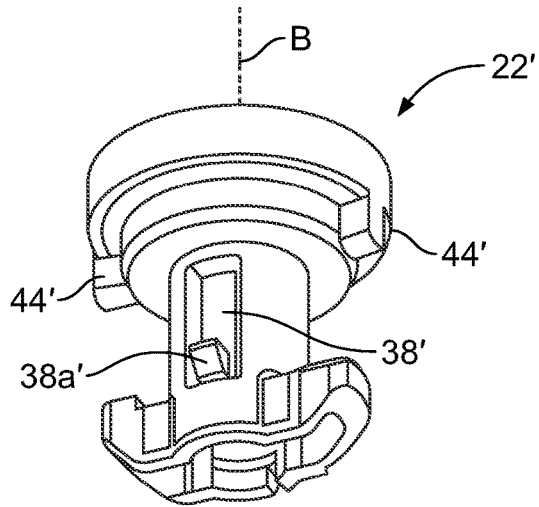

The first component 22', shown alone in FIGS. 26 and 27, is similar to that described previously with reference to FIGS. 5 and 6. The preceding description on the subject of the component 22 therefore applies to the component 22', insofar as it does not contradict what follows.

The body 26' includes an elastic latch that is configured to cooperate with complementary portions of the component 24' or the unit 12'. The latch includes tabs 36', 38' supporting at one of their ends a latching hook 36a', 38a'. The body 26' includes a first circumferential tab 36' formed in the thickness of the body and situated at the lower end of the body. The tab 36' includes a circumferential end connected to the rest of the body and a free circumferential end including the hook 36a'. The second tab 38' of the body is similar to the tab 38 described previously.

The hooks 36a', 38a' extend radially outwards in relation to the axis B. The hooks 36a', 38a' are substantially diametrically opposite one another relative to the axis B. The radially outer free ends are situated on a circumference with a diameter larger than the outside diameter of the body.

In the example shown, the component 22' is made from a single piece, preferably of a plastic material. In this embodiment, the component 22' does not comprise any flanges.

Figure 28:
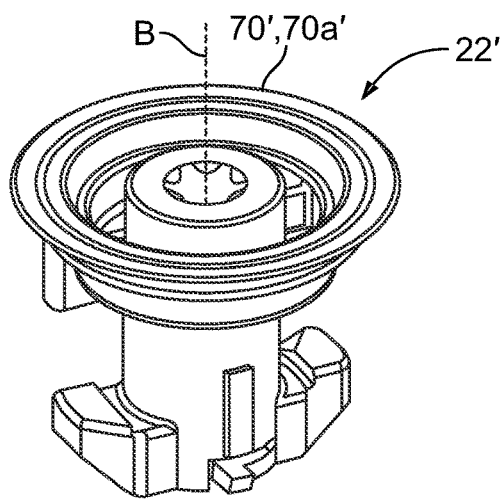
FIGS. 28 and 29 are diagrammatic views in perspective of a first component of another embodiment variant of the securing device according to an embodiment of the present disclosure.
Figure 29:
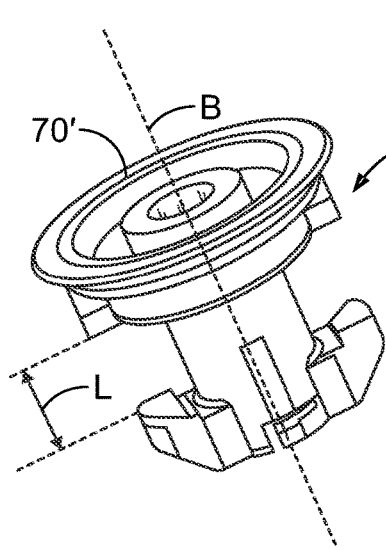
Figure 30:
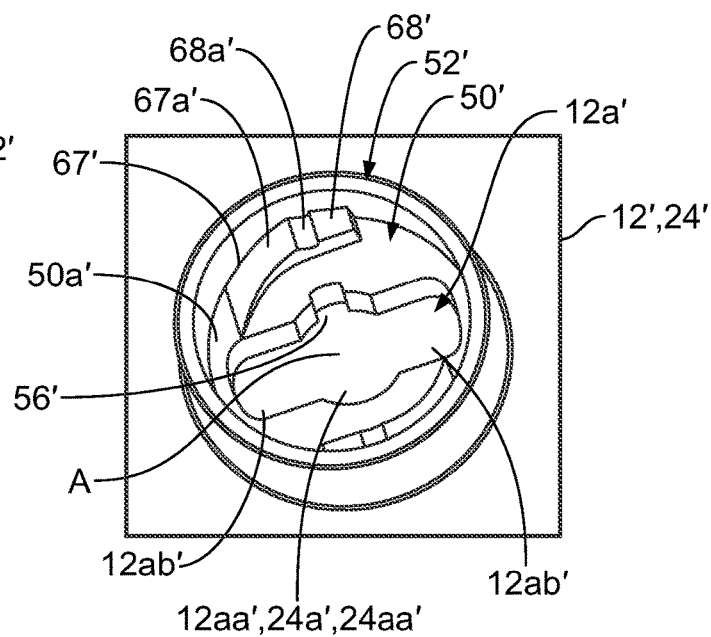
FIG. 30 is a partial diagrammatic view in perspective of a second component for the embodiment variants of FIGS. 20 to 23, which is integral with a unit of the door module type.

As can be seen in FIGS. 28 and 29, the component 22' can further include a seal or sealing means 70'. The seal 70' can be made by overmolding an elastic material on the rest of the component. The rest of the component 22' is preferably made from a single piece, for example of a plastic material. In the example shown, the seal 70' includes at least one outer peripheral ring 70a' configured to ensure peripheral sealing at the upper end of the component 22', between this end and the inner periphery of the skirt 52' of the second component 24', which is henceforth integral with the first unit 12', as mentioned previously and as can be seen in FIG. 30.

Insofar as the second component 24' is considered to include a base 50' and a skirt 52', the base 50' is then considered to be combined with the first unit 12' (module). The flat side 50a' of the base 50' is thus formed by a side of the module. The slot 24a' and the orifice 12a' of the unit are furthermore combined, as mentioned previously.

The slot 24a' opens out on the two faces, respectively upper and lower, of the side 50a' of the module. A longitudinal groove 56' is formed on the radially inner face of the slot 24a', at its central part 24aa'. It is designed to accommodate, by elastic latching, the hook 36a' of the tab 36' in a particular installation position of the device 20', which will be described below. The skirt 52' extends upwards from the side 50a'. The skirt 52' has a generally cylindrical and tubular shape of axis A.

Two ramps 67', diametrically opposite one another and with circumferential orientation around the axis A, are provided radially inside the skirt 52', and at the junction between the skirt and the base 50'. Each ramp 67' defines a cam surface 67a', which is oriented upwards and extends from the upper face of the side 50a' of the base 50' up to a plateau 68' substantially parallel to this side. The plateau 68' includes a recess 68a' oriented upwards, which is situated at the upper end of the corresponding cam surface 67a'.

The followers 44' of the component 22' are configured to cooperate, on the one hand, by sliding, with the cam surfaces 67a' and, on the other hand, by slotting or elastic latching, with the recesses 68a'. When the component 22' rotates in relation to the component 24', the followers 44' slide on the cam surfaces 67a', substantially over their entire angular extent. The followers 44' terminate their travel in the indentations 68a', which define an angular locking position of the component 22' in relation to the component 24', around the axes A, B. In the example shown, this travel represents a quarter turn. In other words, the ramps 67' each have an angular extent equal at the most to 90°. The cooperation of the followers 44' with the cam surfaces 67a' results in a longitudinal translation movement of the first component 22' in relation to the second component 24' upwards, and therefore an axial distancing of the head 28' from the base 50', and an axial convergence of the retaining fingers 32' to the base 50' (that is, to the door module).

FIGS. 31 to 39 show units to be assembled, namely the aforementioned door module 12' and door structure 10'. These units are partially shown here. The units are stacked one on the other with interposition of a seal 72' between them. The units are stacked so that the orifices 10a', 12a' are aligned with one another for installing the securing device or devices 20'.

The seal 72' is similar to the seal 72 described previously. The orifice 10a' of the door structure 10' has a generally similar shape to the orifice 10a described previously.

Figure 31:
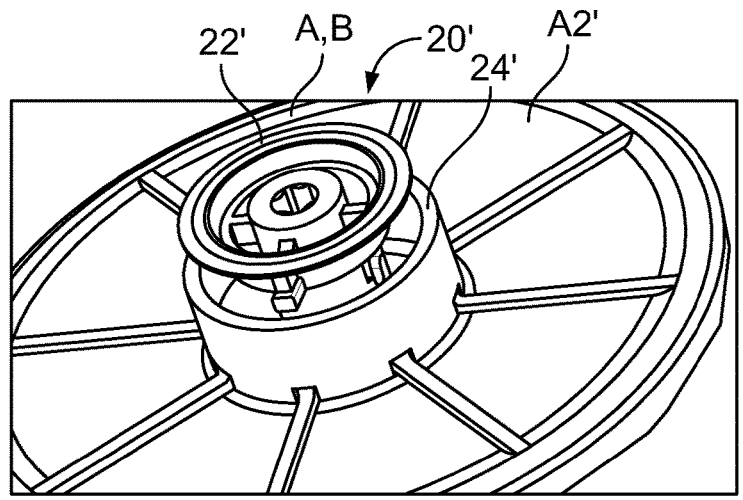
FIGS. 31 to 39 are diagrammatic views in perspective and/or in axial section of a door structure and of the door module of FIG. 30 and of the first component of FIGS. 28 and 29, and show positions and installation and securing steps of the device.
Figure 32:
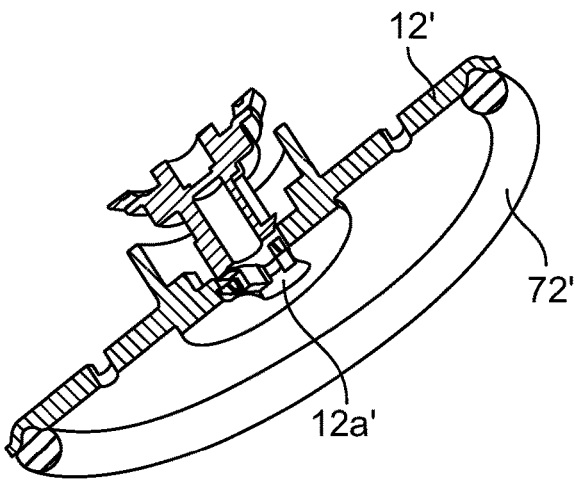

FIGS. 31 and 32 illustrate a pre-installation or pre-assembly position of the device 20' in the orifice 10a' of the unit 10'. The pre-assembly position is obtained by inserting the first component 22' in the second component 24' (that is, the module 12'). For this purpose, the axes A, B are aligned and the fingers 32' of the component 22' are arranged facing the eyes 24ab' of the slot 24' in the longitudinal direction. The component 22' is then moved in axial translation in the component 24' until the hook 36a' of the tab 36' of the body 26' cooperates, by elastic latching, with the notch 56' of the base 50'. The components 22', 24' are then pre-assembled one inside the other. The installation shown in FIGS. 31 and 32 is then obtained, the head 28' of the first component 22' having a position axially distanced from the second component 24'. The module 12' equipped with the device or devices 20' can then be positioned without difficulty on the door structure 10' to be secured to it.

Figure 33:
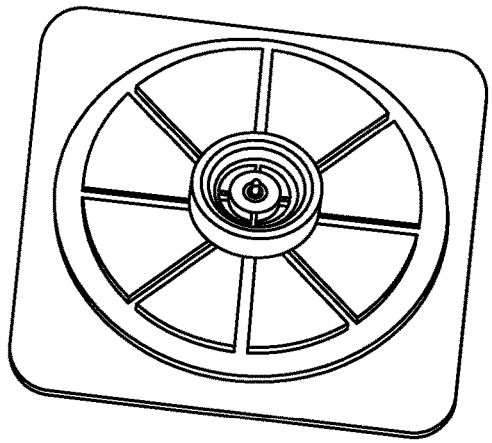
Figure 34:
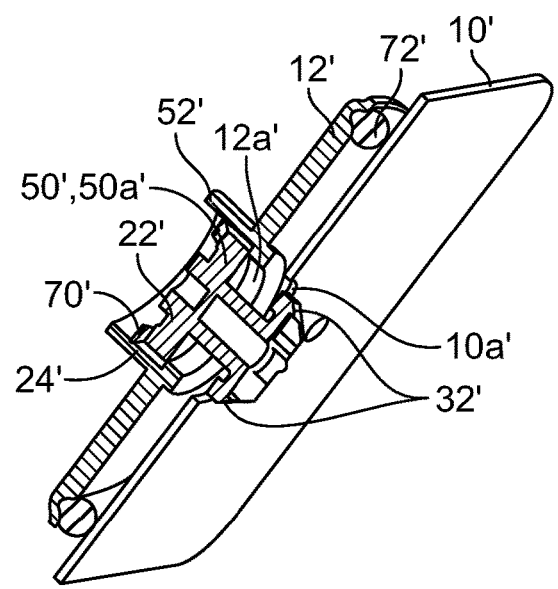
Figure 35:
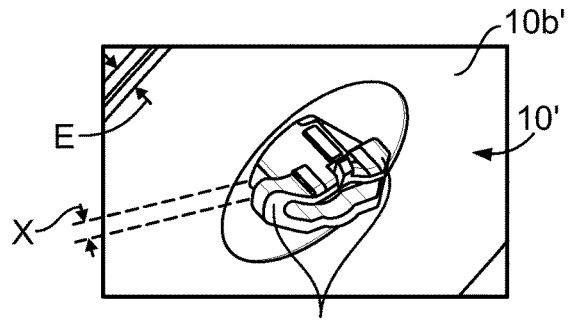

FIGS. 33 to 35 illustrate another position, called the depressed position, of the device 20' in the orifices 10a', 12a' of the units 10', 12'. The depressed position results from a longitudinal translation of the first component 22' in the second component 24' from the position shown in the two preceding figures. This movement is made until the followers 44' of the first component 22' bear against the upper surface of the side 50a' of the base 50' of the second component 24', radially outside the eyes 24ab' of the slot 24' (see FIG. 34). During this movement, the seal 70' cooperates with the inner periphery of the skirt 52'.

FIG. 35 makes it possible to appreciate the fact that, in the assembled position, the fingers 32' of the first component 22' are axially distanced from the lower surface 10b' of the structure 10'. The transverse plane passing through the surfaces 32a' of the fingers is in fact at axial distance X from the plane passing through the outlet of the orifice 10a' on the surface 10b'. This is made possible by the fact that the distance L (FIG. 29) is greater than the calculated thickness E, as in the aforementioned case.

Figure 36:
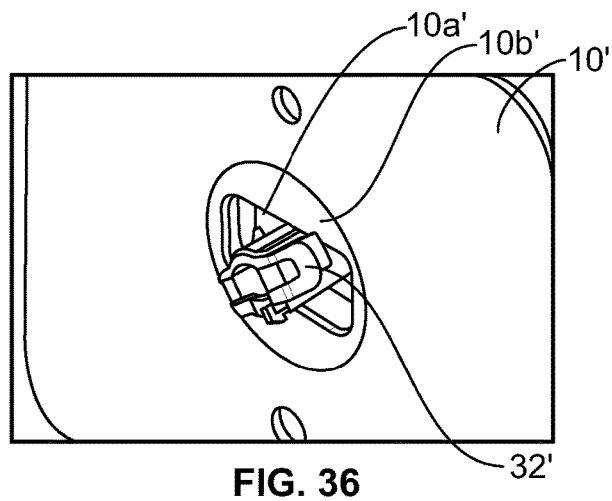
Figure 37:
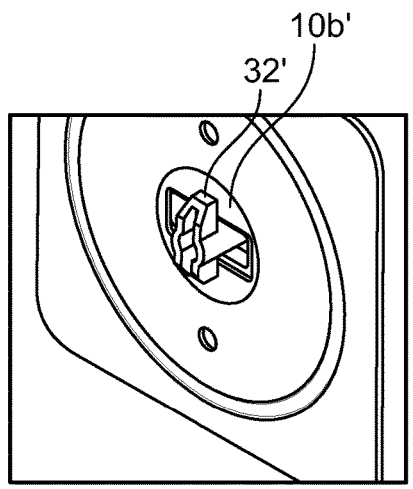
Figure 38:
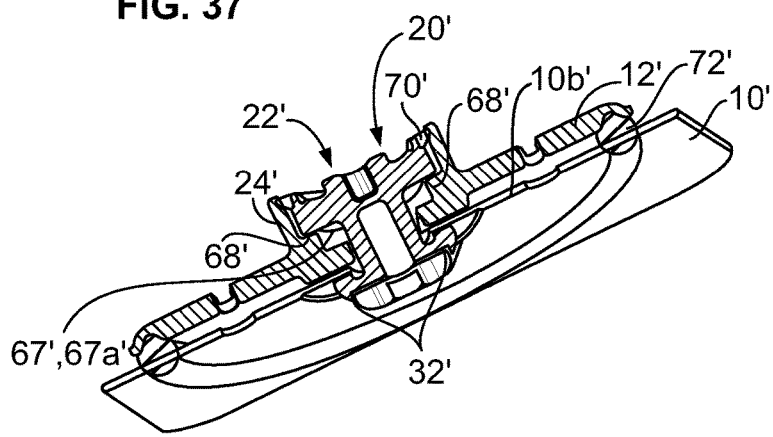
Figure 39:
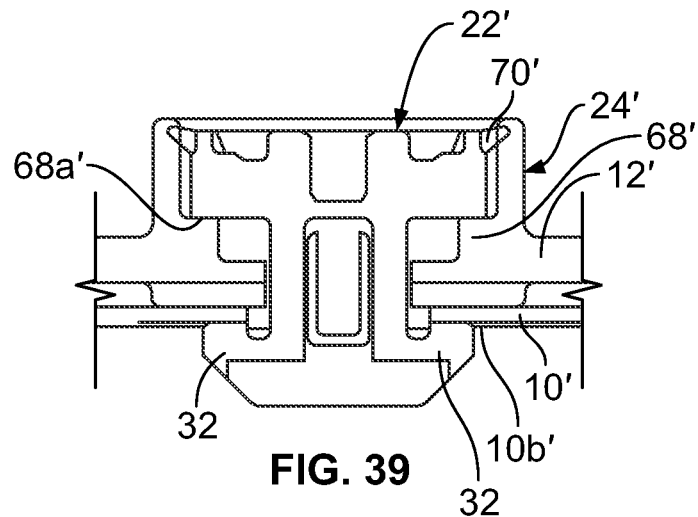

FIGS. 36 to 39 illustrate rotation steps of the first component 22' in the second component 24'. FIG. 36 illustrates an intermediate position in which the component 22' is moved by an eighth of a turn (45°) relative to the depressed position of FIGS. 33 to 35. FIGS. 37 to 39 illustrate a final position in which the component 22' is moved by an additional eighth of a turn (45°) relative to the aforementioned intermediate position, namely one quarter turn in total (90°).

The rotation of the component 22' can be carried out via a tool designed to engage with the part 40' of the head 28'. The movement of the component 22' from the position of FIGS. 33 to 35 to that of FIGS. 37 to 39 causes the followers 44' of the component 22' to slide on the cam surfaces 67a' of the ramps, which causes an upward translation movement of the component 22'.

The fingers 32', and in particular their surfaces 32a', 32b', come closer to the surface 10b' of the structure and can come into contact therewith and slide thereover. The torque applied for starting the rotation of the component does not therefore serve to compress the seal 72'.

The rotation of the component continues until the followers 44' engage by elastic latching in the recesses 68a' of the plateaus 68' of the component 24' (FIG. 39). The fingers 32' bear with their surfaces 32a' on the surface 10b'. The device 20' is then in a secured position.

Figure 40A:
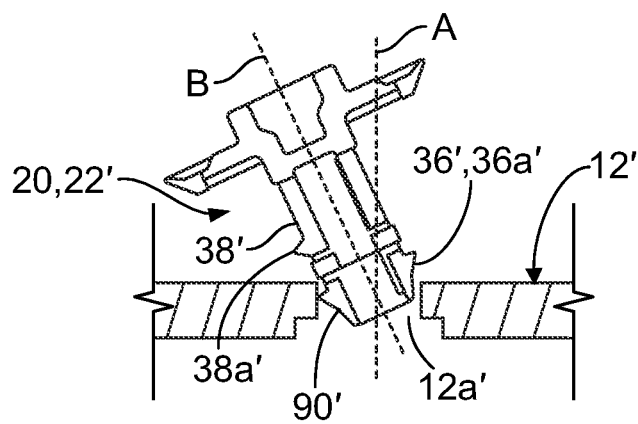
FIGS. 40a and 40b are diagrammatic views in axial section of another variant of the device according to an embodiment of the present disclosure, and show installation steps of the first component.
Figure 40B:
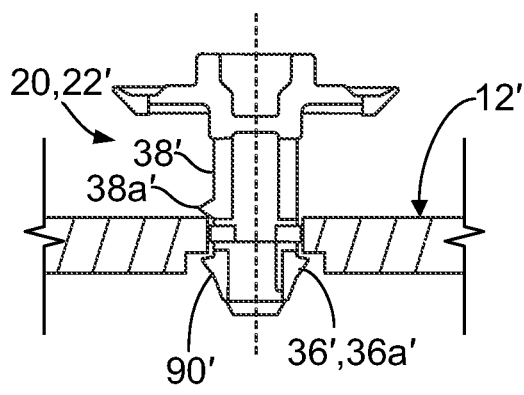

FIGS. 40a and 40b show an alternative at the step of installing and inserting the first component 22' in the orifice 12a' of the module 12'. The body of the component 22' here is inserted in this orifice by longitudinal translation in a direction inclined relative to this axis, then by pivoting in a plane passing through this axis. A tooth 90' can be added to the first component 22' of FIGS. 26 and 27, just below the hook 38a' of the tab 38', diametrically opposite the hook 36a' of the tab 36'. As the device 20' approaches the orifice 12a', the peripheral edge of the central part of the orifice of the module 12' is engaged between the hook 38a' and the tooth 90'. The device is then pivoted until its axis B merges with the axis A, and the tab 36' and its hook 36a' cooperate, by elastic latching, with the opposite peripheral edge of the central part of the module orifice. FIGS. 41 to 46 illustrate a particular example of this embodiment variant.

Figure 41:
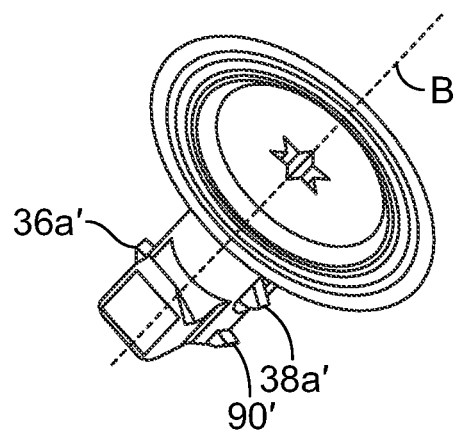
FIGS. 41 to 46 are views similar to the preceding ones and illustrate another embodiment of the present disclosure.
Figure 42:
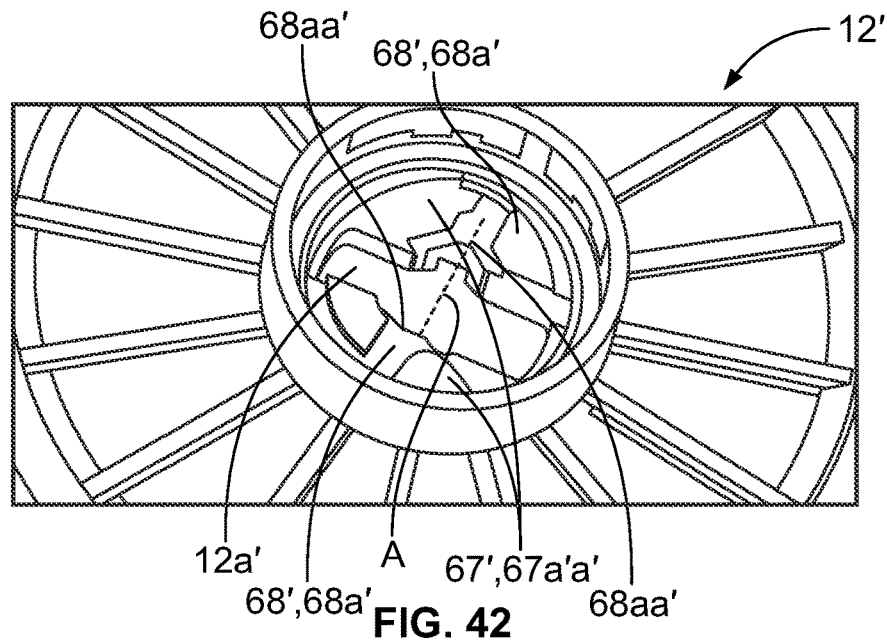
Figure 44:
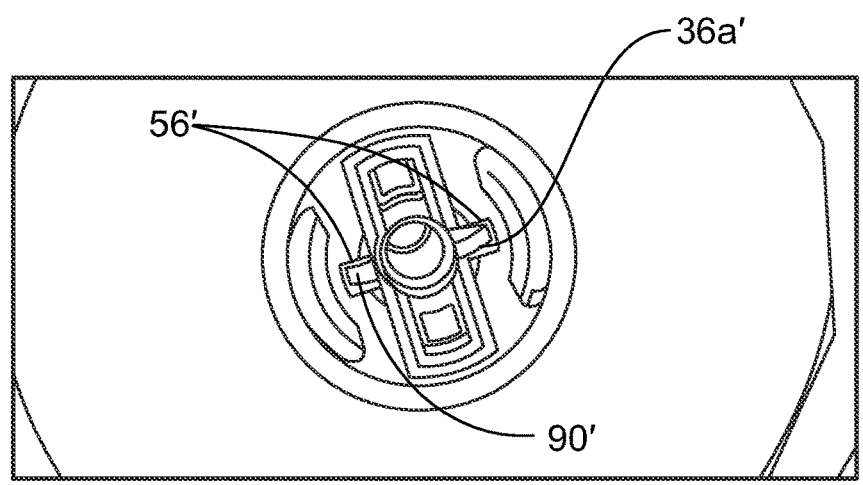
Figure 45:
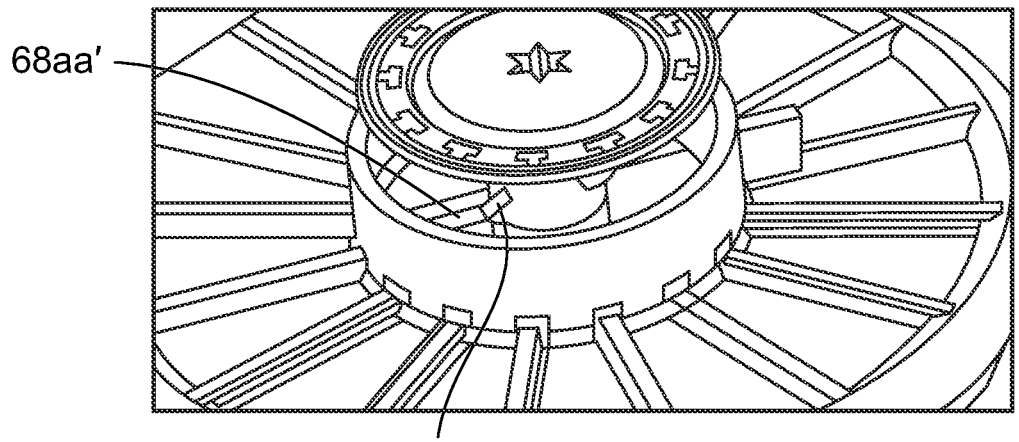

The tooth 90' can be similar to the hook 36a' and can be connected to an elastically deformable tab (FIG. 41). The orifice 12a' here has a symmetrical shape relative to a plane passing through the axis A and substantially parallel to an elongation axis of the orifice, which here also has a transversally elongated shape. The orifice 12a' thus includes two diametrically opposite grooves 56', which are designed to cooperate, by elastic latching, respectively with the tooth 90' and the hook 36a' when the component 22' is in the position shown in FIG. 44. In this position, the hook 38a' bears axially on an inner radial extension 68aa' of the recess 68a' of one of the plateaus 68' (FIG. 45).

Figure 43:
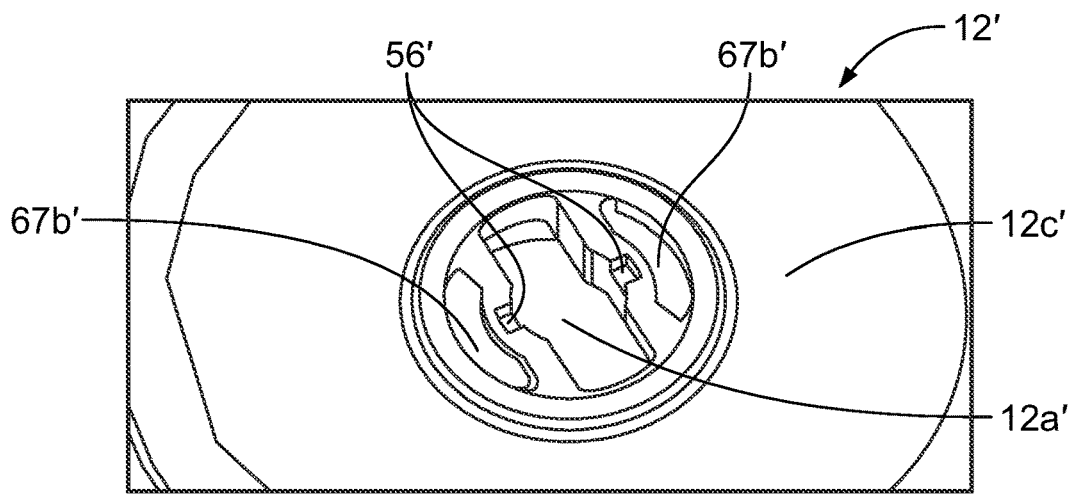

The cam surface 67a' of each ramp 67' here has an angular extent around the axis A, which is smaller than in the preceding cases. As a variant, it could be larger. As can be seen in FIGS. 43 and 44, the ramps 67' are hollow and their inner cavities 67b' open out on the lower surface 12c' of the module 12'.

Figure 46:
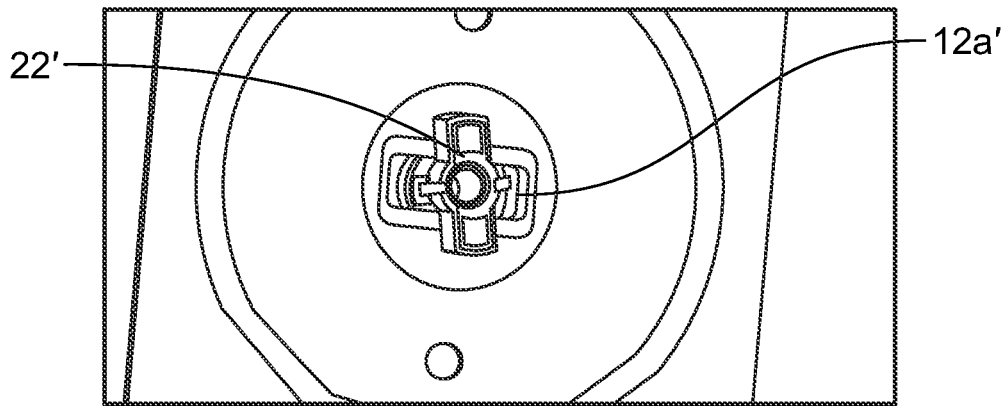

FIG. 46 illustrates the final rotation position of the component 22' in the orifice 12a' of the module 12'.

Figure 47:
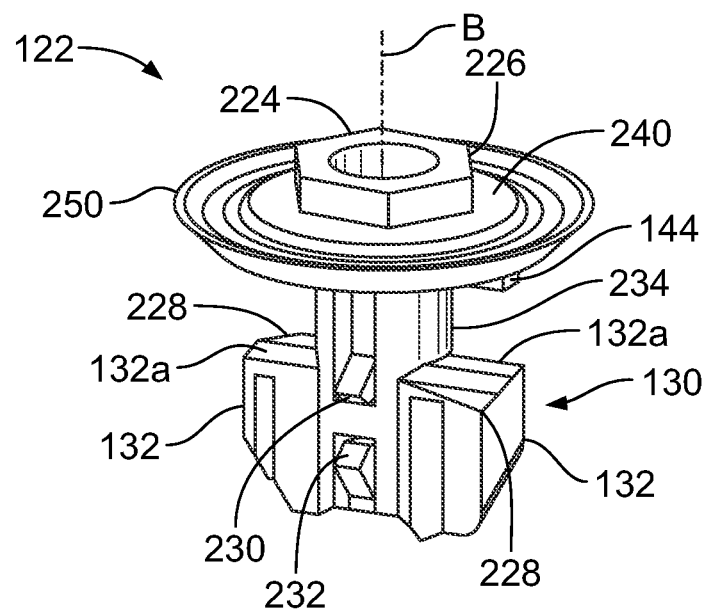
FIG. 47 illustrates a perspective top view of a first component, according to an embodiment of the present disclosure.

FIG. 47 illustrates a perspective top view of a first component 122, according to an embodiment of the present disclosure. FIG. 48 illustrates a perspective bottom view of the first component 122. Referring to FIGS. 47 and 48, the first component 122 is similar to the first components 22 and 22' shown and described with respect to FIGS. 4-6 and 12-41, for example. Like the other first components described in the present disclosure, the first component 122 may be or otherwise form part of a fastening clip device that is configured to secure a door module to a door frame of a vehicle. The fastening clip device ensures a strong, robust attachment between the door module and the door frame that also provides a compressive seal therebetween that resists water intrusion. The fastening clip device is configured to secure the door module to the door frame through a quarter turn, for example.

The first component 122 includes a head 224 that is configured to receive a tool that is used to rotate the fastener. The head 224 may include a hexagonal shape 226 that is configured to be engaged by a corresponding tool, such as a hex wrench. Optionally, the head may be configured and shaped differently in order to be engaged by a different type of tool.

The first component 122 includes lateral coupling protuberances or fingers that are chamfered. The chamfered edges are configured to avoid contact with a slot during rotation of the fastening clip. In particular, as described above, the first component 122 includes a retainer 130 that includes two fingers 132, transverse and diametrically opposite one another relative to a longitudinal axis B of the body. Each finger 132 includes a substantially flat upper surface 132a oriented upwards (that is, towards the head 224). The surfaces 132a of the fingers extend substantially in the same transverse plane perpendicular to the axis B. Each finger may include a downwardly angled or chamfered leading edge 228 (in relation to a direction of rotation). The chamfered edges 228 are configured to avoid contact with a slot during rotation of the first component 122.

As shown, securing clips 230 and 232 are arranged on a central post 234 of the first component 122. The securing clips 230 and 232 are vertically aligned with one another, such that the securing clip 230 is above and spaced apart from the securing clip 232. Followers 144, such as lateral ribs, underneath an upper collar 240 are configured to lock the first component 122 into a fully-installed position. An annular seal 250 may be overmolded to the collar 240 in order to provide a sealing interface with the door module and/or the door frame.

FIG. 49 illustrates a perspective top view of a second component 124 (such as a coupling member), according to an embodiment of the present disclosure. The second component 124 is similar to the second components 24 and 24' shown and described with respect to FIGS. 4, 7, 8, 12-14, 18, 20-25, 30, 31, 38, and 39, for example. As described above, the second component 124 includes a slot 124a formed in a base 150. The slot 124a is configured to receive the first component 122 (shown in FIGS. 47 and 48).

The second component 124 includes slides 300 (or cam surfaces) that engage the first component during rotation. The second component 124 also includes a cylindrical outer main body or rim 302 that ensures a proper rotation of the first component 122 and contact with the seal 250 (shown in FIGS. 47 and 48). For example, the rim 302 axially constrains the first component 122.

One or more notches 304 may be formed in the base 150. The notch 304 is used to locate the first component 122 during an assembly process. The notch 304 prevents over-rotation of the first component 122 in relation to the second component 124. Further, one or more of the notches 304 may be used to provide a locked position of the first component 122 with respect to a door module and/or door structure.

FIG. 50 illustrates a transverse cross-sectional view of a device 120 in which the first component 122 is separated from the second component 124, according to an embodiment of the present disclosure. FIG. 51 illustrates a transverse cross-sectional view of the device 120 in a pre-assembled position. FIG. 52 illustrates a perspective top view of the device 120 in the pre-assembled position. FIG. 53 illustrates a perspective bottom view of the device 120 in the pre-assembled position.

Referring to FIG. 50-53, in order to pre-assemble the device 120, the first component 122 is urged into the slot 124a of the second component 124, which may form part of a door module, or be separately secured to the door module. The securing clips 230 and 232 snapably retain an interior edge portion 301 of the base 150 therebetween. In this manner, the first component 122 is held in a pre-assembled position in relation to the second component 124.

Figure 55:
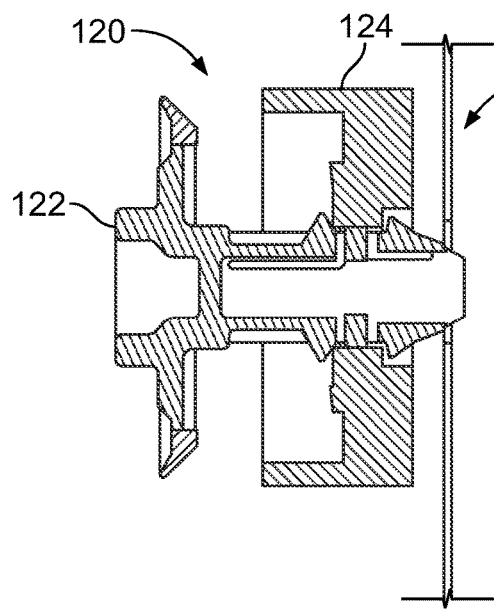
FIG. 55 illustrates a transverse cross-sectional view of a pre-assembled device engaging a unit, according to an embodiment of the present disclosure.
Figure 56:
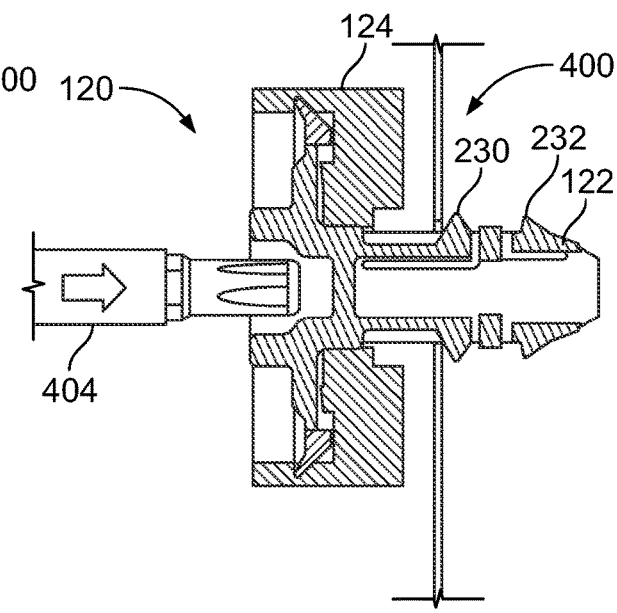
FIG. 56 illustrates a transverse cross-sectional view of a device secured to a unit, according to an embodiment of the present disclosure.

FIG. 54 illustrates a transverse cross-sectional view of a pre-assembled device 120 (that is, the device 120 in a pre-assembled state) separated from a unit 400, according to an embodiment of the present disclosure. FIG. 55 illustrates a transverse cross-sectional view of the pre-assembled device initially engaging the unit 400. FIG. 56 illustrates a transverse cross-sectional view of the device 120 secured to the unit 400.

Referring to FIGS. 54-56, a distal end 260 of the first component 122 may be beveled, rounded, or otherwise contoured in order to lead the device 120 and orient the device 260 into a hole 402 formed in the unit 400 (such as a door module or door structure). As the device 120 is rotated into position relative to the unit 400, the distal end 260 leads and guides the pre-assembled device 120 (including the first component 122 and the second component 124) into position in relation to the hole 402. Once the distal end 260 is inserted into the hole 402, a tool 404 is used to drive the first component 122 further into the hole 402, such that the securing clips 230 and 232 are driven out of the second component 234 and to an opposite side of the unit 400.

Figure 57:
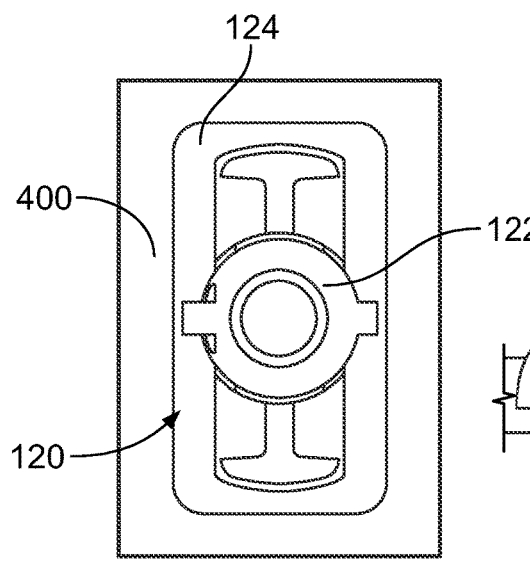
FIG. 57 illustrates a top view of a device initially secured to a unit, according to an embodiment of the present disclosure.
Figure 58:
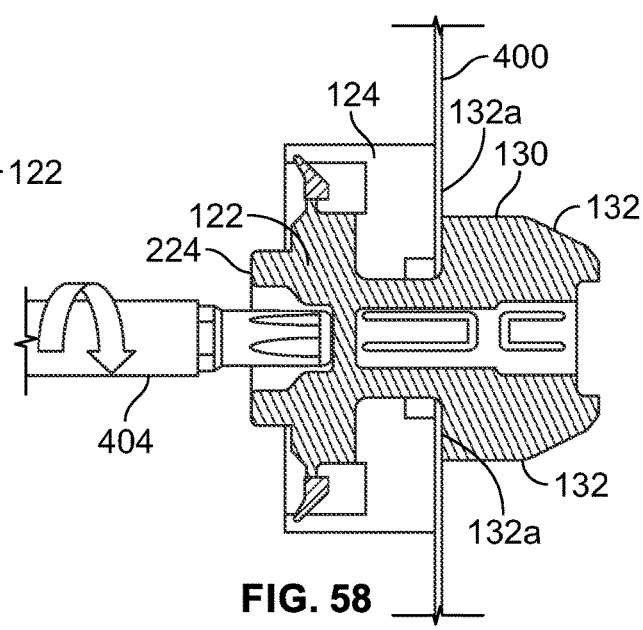
FIG. 58 illustrates a transverse cross-sectional view of a device being engaged into a fully-secured position with respect to a unit, according to an embodiment of the present disclosure.
Figure 59:
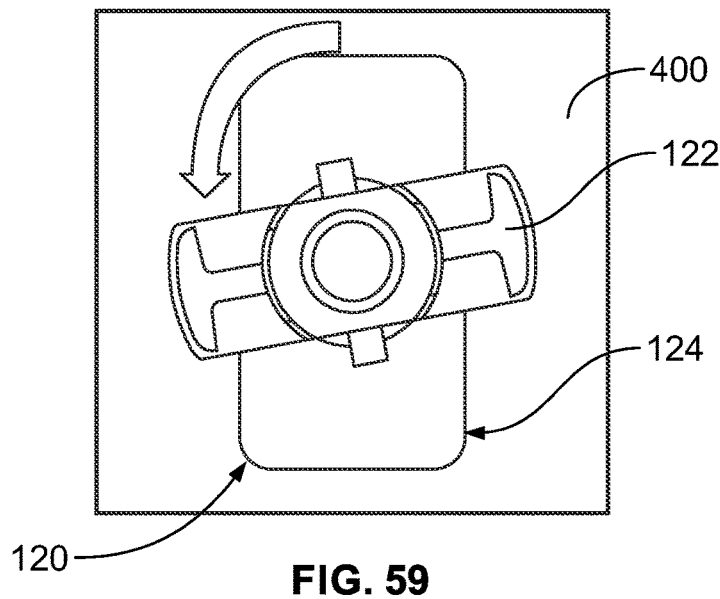
FIG. 59 illustrates a top view of a device fully-secured to a unit, according to an embodiment of the present disclosure.

FIG. 57 illustrates a top view of the device 120 initially secured to the unit 400. FIG. 58 illustrates a transverse cross-sectional view of the device 120 being engaged into a fully-secured position with respect to the unit 400. FIG. 59 illustrates a top view of the device 120 fully-secured to the unit 400.

Referring to FIGS. 57-59, after the device 120 is initially secured to the unit 400, the tool 404 may be used to rotate the first component 122 into a locked position with respect to the second component 124 and the unit 400. In the rotated, locked position, the fingers 132 of the retainer 130 securely engage against the opposite surface of the unit 400 to ensure a secure connection therewith. As described above with respect to FIG. 47, the chamfered edges 228 avoid contact with the slot of the second component 124 during rotation of the first component 122. That is, the chamfered edges 228 ensure that the fingers do not snag onto portions of the second component 124 that define the slot.

Before the annular seal is compressed, the first component 122 is rotated, such as between 40-50 degrees. The chamfered edges 228 of the fingers 132 ensure that the unit 400 is properly engaged before rotation. Because the chamfered edges 228 are recessed below the surfaces 132a, the chamfered edges 228 do not interfere with the hole 402 formed through the unit 400. For example, the chamfered edges 228 do not abut into a surface of the unit 400 proximate to the hole 402. With increased rotation (as shown in FIG. 58), the surfaces 132a compress against the opposite surface of the unit 400.

Figure 60:
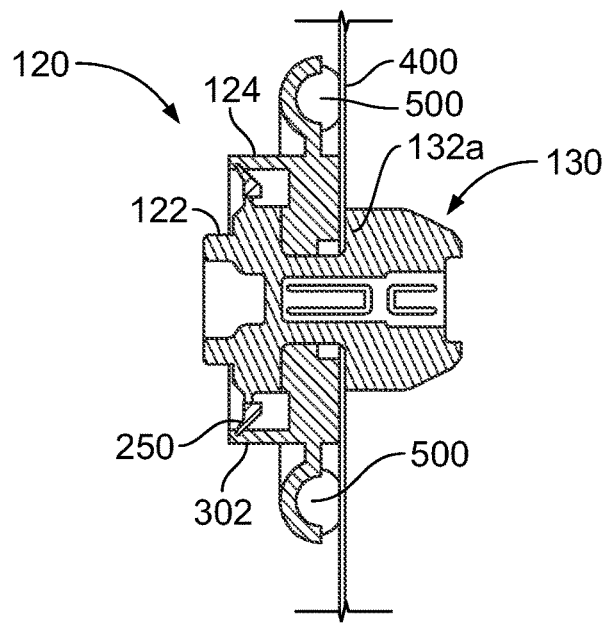
FIGS. 60 and 61 illustrate transverse cross-sectional views (from two different radial perspectives) of a device fully secured to a unit, according to an embodiment of the present disclosure.
Figure 61:
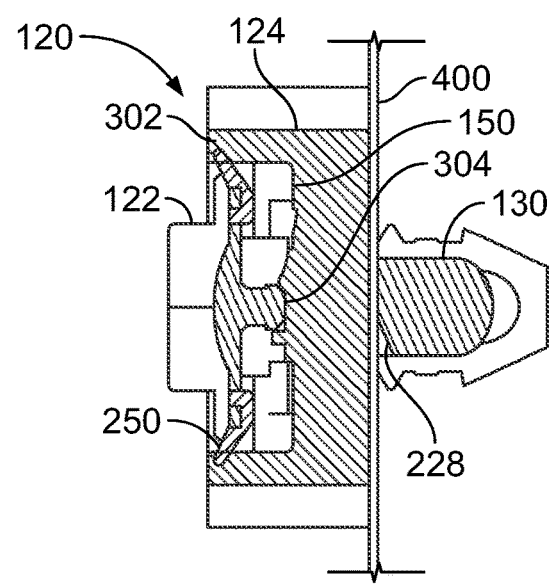

FIGS. 60 and 61 illustrate transverse cross-sectional views (from two different radial perspectives) of a device fully secured to a unit, according to an embodiment of the present disclosure. Referring to FIGS. 60 and 61, when the first component 122 is locked in a final position, an annular seal 500 is compressed between the second component 124 and the unit 400 to ensure a robust sealing interface therebetween. As shown in FIG. 61, in particular, in the locked position, portions of the followers 144 may be snapably retained within notches 304 of the base 150 of the second component 124, thereby locking the first component 122 with respect to the second component 124. Further, in the locked position, the seal 250 of the first component 122 sealingly engages interior surfaces of the rim 302 of the second component 124, thereby providing a robust seal therebetween.

Figure 62:
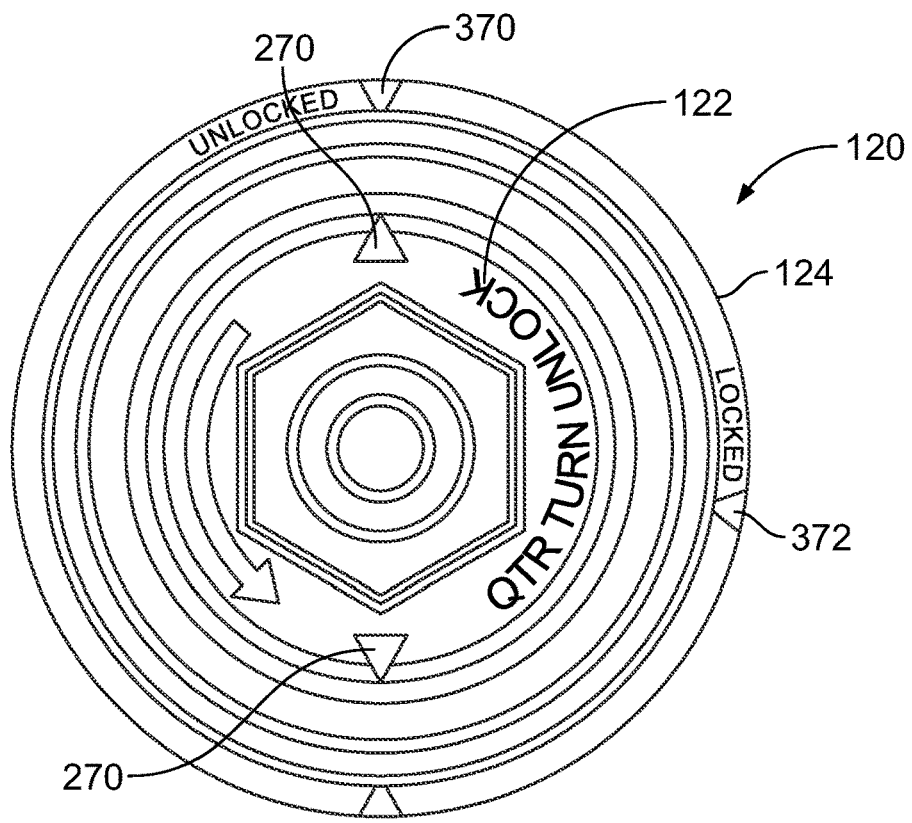
FIG. 62 illustrates a top view of a device in an unlocked position, according to an embodiment of the present disclosure.
Figure 63:
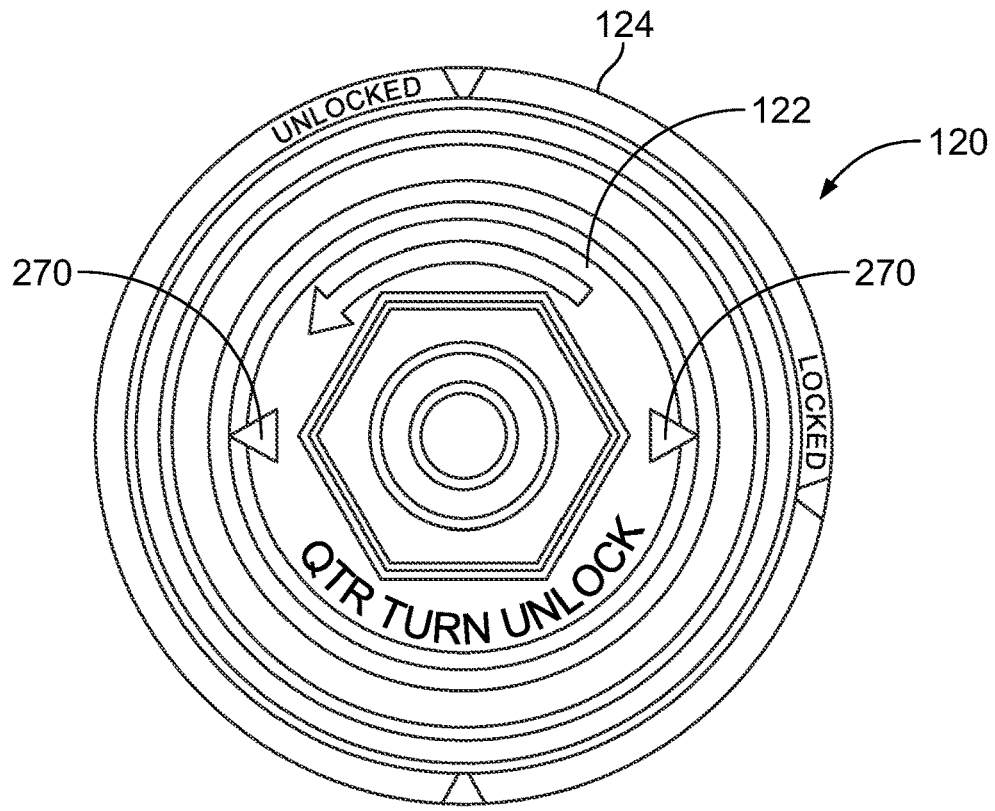
FIG. 63 illustrates a top view of a device in a locked position, according to an embodiment of the present disclosure.

FIG. 62 illustrates a top view of the device 120 in an unlocked position, according to an embodiment of the present disclosure. FIG. 63 illustrates a top view of the device 120 in a locked position, according to an embodiment of the present disclosure. The first component 122 may include first indicia (such as arrows) 270. The second component 124 may include second indicia, such as unlocked indicia 370 and an locked indicia 372. Optionally, the first component 122 may include the second indicia, while the second component 124 may include the first indicia.

When the first indicia 270 aligned with the unlocked indicia 370 (such as via arrow points being as close as possible to one another), a visual indication that the device 120 is in an unlocked state is evident. When the first indicia is aligned with the locked indicia 372, a visual indication that the device 120 is in a locked state is evident.

Figure 64:
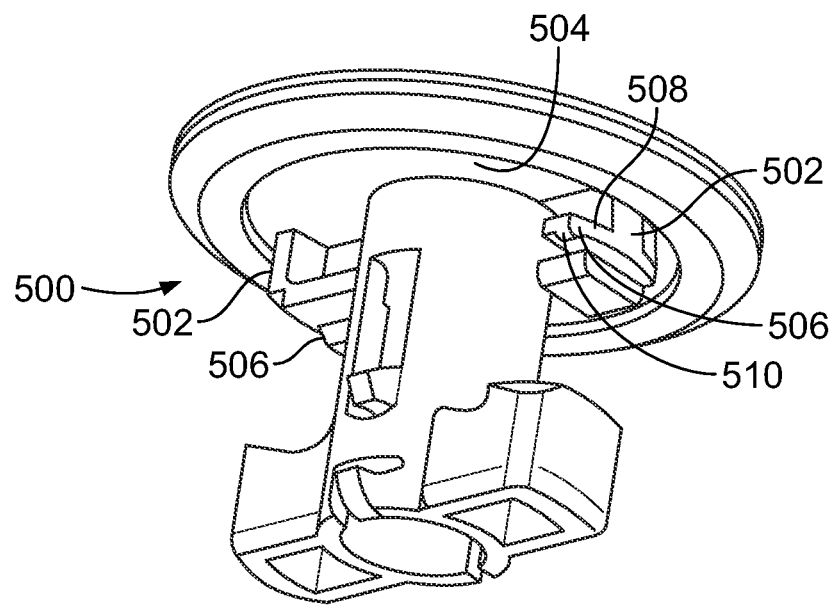
FIG. 64 illustrates a perspective bottom view of a first component, according to an embodiment of the present disclosure.

FIG. 64 illustrates a perspective bottom view of a first component 500, according to an embodiment of the present disclosure. Followers 502, such as lateral ribs, underneath an upper collar 505 are configured to lock the first component 500 into a fully-installed position. Each follower 502 may include a locking tooth 506 at a leading edge 508. The locking tooth 506 extends downwardly from the leading edge 508. The locking tooth 506 may include a downwardly-ramped portion having an apex 510. The locking teeth 506 are configured to latchably secure onto upwardly-extending protuberances (such as ribs, ridges, walls, or the like) of a second component to securely lock the first component 500 onto the second component.

Figure 65:
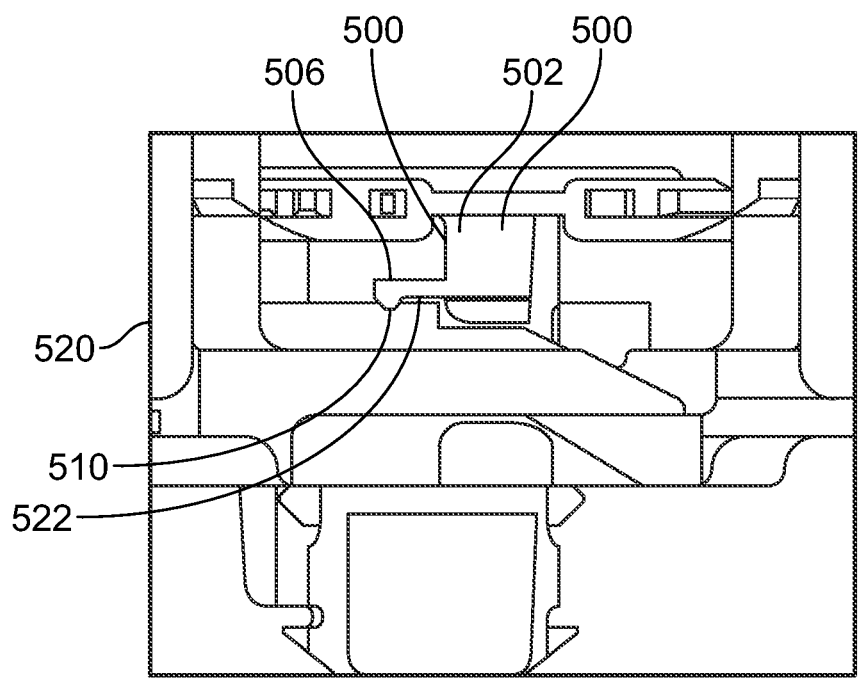
FIG. 65 illustrates a perspective internal view of a first component secured to a second component, according to an embodiment of the present disclosure.

FIG. 65 illustrates a perspective internal view of the first component 500 secured to the second component 520, according to an embodiment of the present disclosure. As shown, the locking tooth 506 is securely latched onto the protuberance 522 extending from a base of the second component 520. As the first component 500 is rotated into a secure position with respect to the second component 520, the locking teeth 506 clip onto the protuberance(s) 522.

As described above, embodiments of the present disclosure provide a fastening clip assembly or device that is configured to securely and efficiently couple two units together, such as a door module to a door frame of a vehicle. In at least one embodiment, the device includes a first component having a head that is configured to receive a tool that is used to rotate the first component in relation to the second component and one or more units. In at least one embodiment, chamfered edges of fingers of a retainer are configured to avoid contact with a slot or opening of a unit during rotation of the first component. Securing clips are arranged on a central post of the first component. Lateral ribs underneath an upper collar are configured to slide and lock the first component into a fully-installed position with respect to the second component and/or the unit(s).

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

Various features of the disclosure are set forth in the following claims.

The invention claimed is:

1. A device for securing one or more units, the device comprising:
    a first component including:
        a body having an elongated shape,
        a head being connected to an upper longitudinal end of the body and including a part that is configured to be rotationally engaged by a tool,
        a retainer at a lower longitudinal end of the body,
        an elastic latch formed in a thickness of the body, wherein the elastic latch includes a tab that comprises an upper end connected to the body and a free lower end; and
    a second component that is configured to couple to the first component, wherein the elastic latch is configured to cooperate with complementary means of one or both of the second component or the one or more units.

2. The device of claim 1, wherein the second component includes at least one cam surface and the first component includes at least one follower, and wherein the follower is configured to cooperate with the at least one cam surface.

3. The device of claim 2, wherein the first component is configured to cooperate with the second component to transform a rotational movement of the first component into a longitudinally-upward translation movement of the first component in relation to the second component.

4. The device of claim 3, wherein portions of the at least one follower are configured to snapably secure into at least one reciprocal notch of the second component to securely lock the first component to the second component.

5. The device of claim 1, wherein the free lower end of the tab includes a securing clip.

6. The device of claim 5, wherein the securing clip extends radially outwards from the tab.

7. The device of claim 1, wherein the body comprises an internal cavity.

8. The device of claim 1, wherein the retainer comprises one or more fingers, and wherein the one or more fingers include at least one chamfered edge.

9. A device for securing a first unit to a second unit, the device comprising:
    a first component including:
        a body having an elongated shape and being configured to be inserted in at least one of a first orifice of the first unit and a second orifice of the second unit,
        a head being connected to an upper longitudinal end of the body, wherein first and second securing clips outwardly extend from a central post of the body of the first component, and wherein the first and the second securing clips are vertically aligned and spaced apart, and
        a retainer at a lower longitudinal end of the body, the retainer being configured to bear against a lower surface of the second unit; and
    a second component that is configured to couple to the first component,
    wherein the first securing clip is positioned above the second securing clip, and
    wherein the first and the second securing clips are unitary with the retainer.

10. The device of claim 9, wherein the first component is configured to cooperate with the second component to transform a rotational movement of the first component into a longitudinally-upward translation movement of the first component in relation to the second component.

11. The device of claim 10, wherein the second component includes at least one cam surface, and wherein the first component includes at least one follower.

12. The device of claim 11, wherein the follower is configured to cooperate with the at least one cam surface, and wherein portions of the at least one follower are configured to snapably secure into at least one reciprocal notch of the second component to securely lock the first component to the second component.

13. The device of claim 9, wherein the head includes a part that is configured to be rotationally engaged by a tool, and wherein a portion of the head includes a hexagonal shape.

14. The device of claim 9, wherein the first component further comprises third and fourth securing clips extending outwardly from the central post diametrically opposite relative to the first and the second securing clips, and wherein the third and the fourth securing clips are vertically aligned and spaced apart.

15. The device of claim 14, wherein the first and the second securing clips and the third and the fourth securing clips are configured to secure the first component to the second component in a pre-assembled position.

16. The device of claim 9, wherein the retainer includes two fingers transverse and diametrically opposite one another relative to a longitudinal axis of the body, and wherein each finger includes:
    a substantially flat upper surface perpendicular to the longitudinal axis of the body; and
    a chamfered edge.

17. A device for securing one or more units, the device comprising:
    a first component including:
        a body having a central post, wherein the body comprises a longitudinal tab, and wherein the longitudinal tab comprises a securing clip,
        a head being connected to an upper longitudinal end of the body and comprising an upper collar, and a retainer at a lower longitudinal end of the body, the retainer including two fingers transverse and diametrically opposite one another relative to a longitudinal axis of the body, wherein at least one of the fingers extends to an upper surface that defines a plane transverse to the body, and wherein the plane defined by the upper surface of the at least one finger extends through a portion of the securing clip; and a second component that is configured to couple to the first component, wherein the longitudinal tab comprises an upper end connected to the body and a free lower end, and wherein the free lower end of the longitudinal tab includes the securing clip.

18. The device of claim 17, wherein the second component includes at least one cam surface and the first component includes at least one follower positioned underneath the upper collar, and wherein the at least one follower is configured to cooperate with the at least one cam surface to transform a rotational movement of the first component into a longitudinally-upwards translation movement of the first component in relation to the second component so that the retainer bears on a lower surface of one of the units.

19. The device of claim 17, wherein each of the two fingers comprise at least one notch extending therein.

20. The device of claim 17, wherein the securing clip extends radially outwards from the longitudinal tab.

* * * * *